United States Patent
Lyu et al.

(10) Patent No.: US 11,197,283 B2
(45) Date of Patent: Dec. 7, 2021

(54) CONTROL INFORMATION SENDING METHOD, CONTROL INFORMATION RECEIVING METHOD, AND RELATED DEVICE

(71) Applicant: Huawei Technologies Co., Ltd., Shenzhen (CN)

(72) Inventors: Yongxia Lyu, Ottawa (CA); Ruixiang Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 109 days.

(21) Appl. No.: 16/577,941

(22) Filed: Sep. 20, 2019

(65) Prior Publication Data
US 2020/0015212 A1 Jan. 9, 2020

Related U.S. Application Data

(63) Continuation of application No. PCT/CN2018/080251, filed on Mar. 23, 2018.

(30) Foreign Application Priority Data

Mar. 23, 2017 (CN) .......................... 201710179923.1

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1819* (2013.01); *H04L 5/0055* (2013.01); *H04W 24/08* (2013.01); *H04W 72/0466* (2013.01)

(58) Field of Classification Search
CPC .................................................. H04W 72/042
See application file for complete search history.

(56) References Cited

U.S. PATENT DOCUMENTS

| | | | |
|---|---|---|---|
| 2013/0021988 A1* | 1/2013 | Chen ................. | H04W 72/1289 370/329 |
| 2013/0044700 A1* | 2/2013 | Cheng ................. | H04W 74/004 370/329 |

(Continued)

FOREIGN PATENT DOCUMENTS

| | | |
|---|---|---|
| CN | 101478822 A | 7/2009 |
| CN | 102740372 A | 10/2012 |

(Continued)

*Primary Examiner* — Edan Orgad
*Assistant Examiner* — Won Tae C Kim
(74) *Attorney, Agent, or Firm* — Slater Matsil, LLP

(57) ABSTRACT

In a control information sending method, a network device sends first physical layer control information to a first terminal device, where the first physical layer control information indicates a first index to the first terminal device, and instructs the first terminal device to monitor second physical layer control information within a first time period. The network device sends the second physical layer control information to at least one terminal device within the first time period, where the second physical layer control information includes at least one control information field, the at least one control information field includes a first control information field, and the first control information field instructs the first terminal device to receive or send data, or the first control information field instructs the first terminal device to receive or send data or not to receive or send data.

20 Claims, 10 Drawing Sheets

(51) Int. Cl.
    *H04L 5/00*         (2006.01)
    *H04W 24/08*     (2009.01)

(56) References Cited

U.S. PATENT DOCUMENTS

| | | |
|---|---|---|
| 2013/0114580 A1 | 5/2013 | Saitou et al. |
| 2013/0121317 A1 | 5/2013 | Lee et al. |
| 2014/0010212 A1 | 1/2014 | McNamara et al. |
| 2015/0215916 A1 | 7/2015 | Chen et al. |
| 2015/0257086 A1 | 9/2015 | Jiang et al. |
| 2016/0295561 A1 | 10/2016 | Papasakellariou |
| 2018/0070385 A1 | 3/2018 | Yang et al. |
| 2019/0274131 A1* | 9/2019 | Yamazaki .............. H04L 1/1861 |
| 2020/0236732 A1* | 7/2020 | Liu ......................... H04L 27/26 |

FOREIGN PATENT DOCUMENTS

| | | |
|---|---|---|
| CN | 103098527 A | 5/2013 |
| CN | 103444252 A | 12/2013 |
| CN | 103716121 A | 4/2014 |
| CN | 104144502 A | 11/2014 |
| CN | 104144503 A | 11/2014 |
| WO | 2013066128 A1 | 5/2013 |
| WO | 2014069946 A1 | 5/2014 |
| WO | 2015012664 A1 | 1/2015 |
| WO | 2016163758 A1 | 10/2016 |

\* cited by examiner

| 0 (sequence number #1) | Control information field set #20 |
| 1 (sequence number #1) | Control information field set #21 |
| 5 (sequence number #1) | Control information field set #25 |
| 7 (sequence number #1) | Control information field set #27 |

CONTROL INFORMATION SENDING METHOD, CONTROL INFORMATION RECEIVING METHOD, AND RELATED DEVICE

CROSS-REFERENCE TO RELATED APPLICATIONS

This application is a continuation of International Application No. PCT/CN2018/080251, filed on Mar. 23, 2018, which claims priority to Chinese Patent Application No. 201710179923.1, filed on Mar. 23, 2017. The disclosures of the aforementioned applications are hereby incorporated by reference in their entireties.

TECHNICAL FIELD

This application relates to the field of communication technologies, and in particular, to a control information sending method, a control information receiving method, and a related device.

BACKGROUND

A 5th generation (5G for short) mobile communication technology is an extension of a 4th generation (4G for short) mobile communication technology that is currently being advanced, and is under study. Based on a requirement of the International Telecommunication Union (ITU) for 5G, 5G needs to support various services in the future, for example, an enhanced mobile broadband (eMBB) service, an ultra-reliable and low-latency communication (URLLC) service, and a massive machine type communication (Massive MTC) service. The eMBB service, for example, a bandwidth-hungry mobile broadband service such as a 3D/ultra high definition video, has relatively high requirements on a transmission rate, signal coverage, a transmission latency, mobility, and the like. The URLLC service, for example, a service requiring a low latency and high reliability, such as unmanned driving or industrial automation, has very high requirements on reliability, mobility, and a transmission latency. The massive MTC service such as large-scale internet of things services has relatively high requirements on a quantity of connections (connection density) per region and signal coverage.

In some 5G scenarios, different types of services need to be supported. However, different types of services usually have different system requirements, and therefore different requirements of different services often cannot be all met. In addition, an architecture and various design details of the 5G system are still under discussion. Therefore, how to resolve a problem of compatibility and flexible scheduling of different services in 5G is not provided.

SUMMARY

Embodiments of this application is to provide a control information sending method, a control information receiving method, and a related device, to resolve a prior-art technical problem that service scheduling is not flexible enough in a 5G scenario.

According to a first aspect, an embodiment of this application provides a control information sending method, where the method may include: sending, by a network device, first physical layer control information to a first terminal device, where the first physical layer control information is used to indicate a first index to the first terminal device, and is used to instruct the first terminal device to monitor second physical layer control information within a first time period, and the first index is used by the first terminal device to determine a control information field that is in the second physical layer control information and that corresponds to the first terminal device; and sending, by the network device, the second physical layer control information to at least one terminal device within the first time period, where the at least one terminal device includes the first terminal device, the second physical layer control information includes at least one control information field, the at least one control information field includes a first control information field, and the first control information field is used to instruct the first terminal device to receive or send data, or the first control information field is used to instruct the first terminal device to receive or send data or not to receive or send data.

Through implementation of this embodiment of this application, control information may be divided into two levels: the dedicated first physical layer control information and the common second physical layer control information for controlling scheduling, to obtain two levels of control channels including a dedicated channel and a common channel. In addition, because the first physical layer control information and the second physical layer control information are separately transmitted, transmission occasions, transmitted resources, included control information content, and indicated terminal device ranges of the two levels of control information may certainly be different, or there may even be a plurality of possibilities through arrangement and combination. Therefore, a plurality of scheduling manner possibilities may be generated in the service scheduling framework, thereby improving scheduling flexibility and meeting different requirements of different services.

Optionally, the sending, by the network device, the second physical layer control information to at least one terminal device within the first time period includes: sending, by the network device, the second physical layer control information in common search space within the first time period, where the common search space is search space that is common to the at least one terminal device or common to a serving cell.

Through implementation of this embodiment of this application, the common second physical layer control information may be sent to a plurality of terminal devices by using the common search space, so that resource overheads are reduced.

Optionally, the at least one terminal device belongs to a first terminal device group; and the first physical layer control information is further used to indicate a first group index, and the first group index is used to identify the first terminal device group.

Through implementation of this embodiment of this application, a plurality of terminal devices that need to receive the second physical layer control information may be identified by using the first group index.

Optionally, the second physical layer control information is scrambled by using a first scrambling code sequence, and the first scrambling code sequence is calculated by using at least the first group index or a cell ID.

Through implementation of this embodiment of this application, the terminal device may monitor and receive the corresponding second physical layer control information based on the obtained first group index or cell ID.

Optionally, the first physical layer control information includes resource indication information, the first control information field is used to instruct the first terminal device to receive or send data by using a resource indicated by the resource indication information, and the resource includes a frequency domain resource, a time domain resource, or a time-frequency resource.

Through implementation of this embodiment of this application, the first physical layer control information includes the indication information indicating the resource used to transmit data, so that overheads for sending the resource indication information in the second physical layer control information a plurality of times are avoided.

Optionally, the first physical layer control information includes a first field, and the first field includes at least one of a modulation and coding scheme indication field, a new data indicator field, a redundancy version indication field, a transmit power control TPC indication field, and a hybrid automatic repeat request HARQ process number indication field; and that the first physical layer control information is used to indicate a first index to the first terminal device includes: the first physical layer control information is used to indicate the first index by reusing the first field.

Optionally, the method further includes: configuring, by the network device, a maximum value of the first index by using higher layer signaling; or configuring, by the network device by using higher layer signaling, a quantity of bits or a quantity of significant bits included in a field corresponding to the first index.

Optionally, the method further includes: predefining, by the network device, the first time period; or configuring, by the network device, the first time period by using higher layer signaling; or indicating, by the network device, the first time period by using the first physical layer control information.

Optionally, the at least one terminal device includes X terminal devices, and the at least one control information field includes Y control information fields, where both X and Y are positive integers. If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data; or if Y is less than X, the first control information field is used to instruct the first terminal device to receive or send data; or if Y is greater than X, the first control information field is used to instruct the first terminal device to receive or send data or not to receive or send data.

Optionally, the X terminal devices further include a second terminal device. The method further includes: sending, by the network device, third physical layer control information to the second terminal device, where the third physical layer control information is used to indicate a second index to the second terminal device, and is used to instruct the second terminal device to monitor fourth physical layer control information within a second time period, the second index is used by the second terminal device to determine a control information field that is in the fourth physical layer control information and that corresponds to the second terminal device, the fourth physical layer control information is the second physical layer control information within a third time period which is an overlapped part of the first time period and the second time period, and within the third time period, if Y is less than X, and the Y control information fields do not include the control information field corresponding to the second terminal device, the second physical layer control information is used to instruct the second terminal device not to receive or send data.

Optionally, the method further includes: predefining, by the network device, a value of Y, where the first control information field is used to instruct the first terminal device to receive or send data or not to receive or send data; or sending, by the network device, higher layer signaling to the first terminal device, where the higher layer signaling is used to indicate a value of Y.

Optionally, the first physical layer control information further includes a first parameter set. The first parameter set includes at least one of a modulation and coding scheme MCS index, a hybrid automatic repeat request process HARQ process index, a new data indicator NDI, a redundancy version RV index, a HARQ acknowledgement feedback HARQ-ACK feedback time-frequency resource indicator, a downlink assignment index DAI, the first index, and the first time period. The first control information field is used to instruct the first terminal device to receive or send data based on the first parameter set.

Optionally, the first physical layer control information further includes second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period. The second physical layer control information further includes a third parameter set. The third parameter set includes at least one of a HARQ process index, a new data indicator NDI, a redundancy version RV index, the HARQ acknowledgement feedback HARQ-ACK feedback time-frequency resource indicator, and the downlink assignment index DAI. The first control information field is used to instruct the first terminal device to receive or send data based on the second parameter set and the third parameter set.

According to a second aspect, an embodiment of this application provides a control information receiving method, where the method may include: receiving, by a first terminal device, first physical layer control information sent by a network device, where the first physical layer control information indicates a first index, and is used to instruct the first terminal device to monitor second physical layer control information within a first time period, and the first index corresponds to the first terminal device within the first time period; receiving, by the first terminal device within the first time period, the second physical layer control information sent by the network device, where the second physical layer control information includes at least one control information field, the at least one control information field includes a first control information field, and the first control information field is used to instruct the first terminal device to receive or send data, or the first control information field is used to instruct the first terminal device to receive or send data or not to receive or send data; and determining, by the first terminal device based on the first index, the first control information field that is in the second physical layer control information and that corresponds to the first terminal device.

Optionally, the receiving, by the first terminal device within the first time period, the second physical layer control information sent by the network device includes: receiving, by the first terminal device within the first time period, the second physical layer control information sent by the network device in common search space, where the common search space is search space that is common to a terminal device group to which the first terminal device belongs or that is common to a serving cell, and the terminal device group includes at least the first terminal device.

Optionally, the first physical layer control information includes resource indication information, and the method further includes: receiving or sending, by the first terminal device, data according to the first control information field by using a resource indicated by the resource indication information, where the resource includes a frequency domain resource, a time domain resource, or a time-frequency resource.

Optionally, the first physical layer control information further indicates a first group index, and the method further includes: determining, by the first terminal device based on the first group index, a first terminal device group to which the first terminal device belongs.

Optionally, the second physical layer control information is scrambled by using a first scrambling code sequence, and the first scrambling code sequence is calculated by using at least the first group index or a cell ID.

Optionally, the first terminal device group includes X terminal devices, and the at least one control information field includes Y control information fields, where both X and Y are positive integers. If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data; or if Y is less than X, the first control information field is used to instruct the first terminal device to receive or send data; or if Y is greater than X, the first control information field is used to instruct the first terminal device to receive or send data or not to receive or send data.

Optionally, the first physical layer control information further includes a first parameter set. The first parameter set includes at least one of a modulation and coding scheme MCS index, a hybrid automatic repeat request process HARQ process index, a new data indicator NDI, a redundancy version RV index, a HARQ acknowledgement feedback HARQ-ACK feedback time-frequency resource indicator, a downlink assignment index DAI, the first index, and the first time period. The method further includes: receiving or sending, by the first terminal device, data according to the first control information field and the first parameter set.

Optionally, the first physical layer control information further includes a second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period. The second physical layer control information further includes a third parameter set. The third parameter set includes at least one of a HARQ process index, a new data indicator NDI, a redundancy version RV index, the HARQ acknowledgement feedback HARQ-ACK feedback time-frequency resource indicator, and the downlink assignment index DAI. The method further includes: receiving or sending, by the first terminal device, data according to the first control information field, the second parameter set, and the third parameter set.

Optionally, the method further includes: monitoring, by the first terminal device, the first physical layer control information at intervals of M time domain units, and monitoring the second physical layer control information at intervals of N time domain units, where both M and N are positive integers greater than or equal to 1, and M is greater than N.

According to a third aspect, this application provides a network device, where the network device has a function of implementing the method in the foregoing control information sending method embodiment. The function may be implemented by hardware, or may be implemented by hardware by executing corresponding software. The hardware or the software includes one or more modules corresponding to the function.

According to a fourth aspect, this application provides a terminal device, where the terminal device has a function of implementing the method in the foregoing control information receiving method embodiment. The function may be implemented by hardware, or may be implemented by hardware by executing corresponding software. The hardware or the software includes one or more modules corresponding to the function.

According to a fifth aspect, this application provides a network device, where the network device includes a processor, and the processor is configured to support the network device in performing a corresponding function in the control information sending method provided in the first aspect. The network device may further include a memory. The memory is coupled to the processor, and stores a program instruction and data that are necessary for the network device. The network device may further include a communication interface, configured to implement communication between the network device and another device or a communication network.

According to a sixth aspect, this application provides a terminal device, where the terminal device includes a processor, and the processor is configured to support the terminal device in performing a corresponding function in the control information receiving method provided in the second aspect. The terminal device may further include a memory. The memory is coupled to the processor, and stores a program instruction and data that are necessary for the terminal device. The terminal device may further include a communication interface, configured to implement communication between the terminal device and another device or a communication network.

According to a seventh aspect, this application provides a computer storage medium, configured to store a computer software instruction used by the network device provided in the fifth aspect, where the computer software instruction includes a program designed for performing the foregoing aspect.

According to an eighth aspect, this application provides a computer storage medium, configured to store a computer software instruction used by the terminal device provided in the sixth aspect, where the computer software instruction includes a program designed for performing the foregoing aspect.

According to a ninth aspect, an embodiment of this application provides a computer program, where the computer program includes an instruction, and when the computer program is executed by a computer, the computer can perform the procedure of the control information sending method in any one of the first aspect.

According to a tenth aspect, an embodiment of this application provides a computer program, where the computer program includes an instruction, and when the computer program is executed by a computer, the computer can perform the procedure of the control information receiving method in any one of the second aspect.

Optionally, the first physical layer control information includes a second field, and that the first physical layer control information is further used to indicate a first group index includes: indicating, by the network device, the first group index by reusing a second preset field in the first physical layer control information.

Optionally, the network device indicates the first index by using a time-frequency resource location that is used for sending the first physical layer control information.

Optionally, the network device indicates the first index by using a control resource set for sending the $1^{st}$ CCE or REG in a specified control resource set in the first physical layer control information; or indicates the first group index by using a control resource set for sending the $1^{st}$ CCE or REG in a specified control resource set in the first physical layer control information.

Optionally, the network device configures a maximum value of the first group index by using higher layer signaling; or the network device configures, by using higher layer signaling, a quantity of bits or a quantity of significant bits included in a field corresponding to the first group index.

In the embodiments of this application, the network device sends the first physical layer control information to the first terminal device, and sends, within the first time period, the second physical layer control information to the at least one terminal device including the first terminal device, to instruct, by using the at least one control information field (including the first control information field) included in the second physical layer control information, the first terminal device to receive or send data, or instruct the first terminal device to receive or send data or not to receive or send data. The first physical layer control information indicates the first index to the first terminal device, and is used to instruct the first terminal device to monitor the second physical layer control information within the first time period and determine, by using the first index, the control information field that is in the second physical layer control information and that corresponds to the second physical layer control information, so that it is finally determined whether to perform scheduling. In other words, in this application, when determining that scheduling needs to be performed for the first terminal device, the network device sends the dedicated first physical layer control information to the first terminal device, to instruct in advance the first terminal device to monitor, within the first time period, the second physical layer control information corresponding to the first terminal device. Then the network device sends, within the notified first time period as appointed, the common second physical layer control information to the at least one terminal device including the first terminal device, to specifically notify the first terminal device whether final service scheduling is to be performed. Therefore, this application provides an overall service scheduling framework in which control information is divided into two levels: the dedicated first physical layer control information and the common second physical layer control information for controlling scheduling, to obtain two levels of control channels including a dedicated channel and a common channel. In addition, because the first physical layer control information and the second physical layer control information are separately transmitted, transmission occasions, transmitted resources, included control information content, and indicated terminal device ranges of the two levels of control information may certainly be different, or there may even be a plurality of possibilities through arrangement and combination. Therefore, a plurality of scheduling manner possibilities may be generated in the service scheduling framework, thereby improving scheduling flexibility and meeting different requirements of different services.

BRIEF DESCRIPTION OF THE DRAWINGS

To describe the technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

Figure 1:
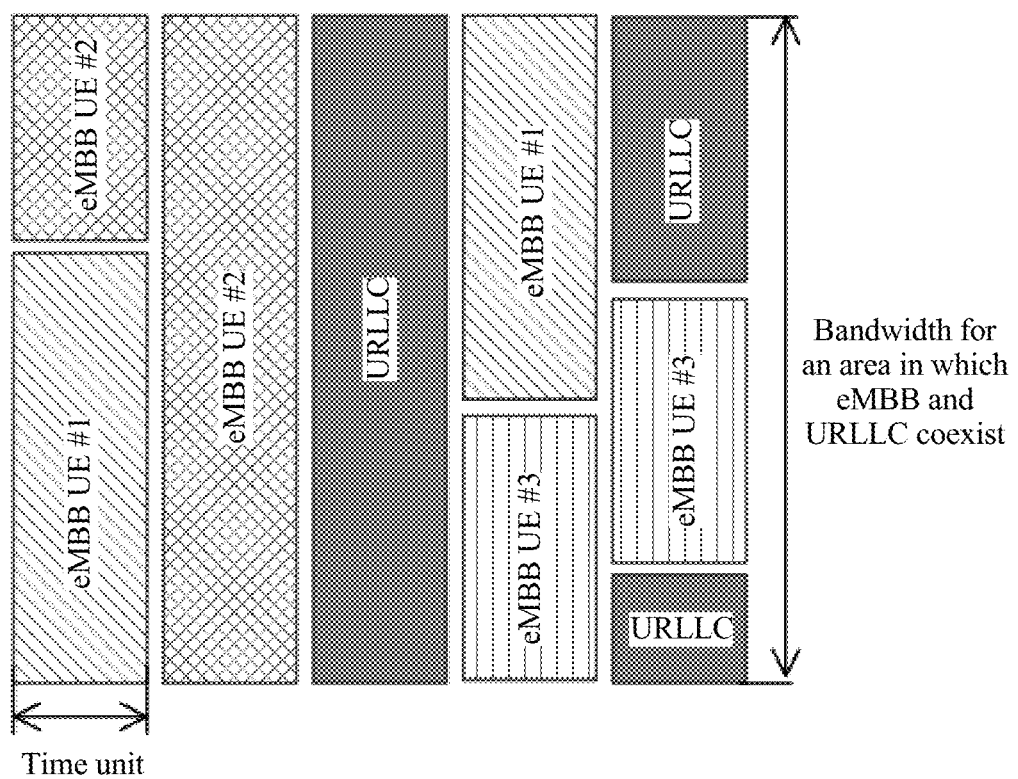
FIG. 1 is a schematic diagram of a specific application scenario in which eMBB and URLLC are transmitted by using same time domain units according to an embodiment of this application.

The following describes the embodiments of this application with reference to the accompanying drawings in the embodiments of this application.

In the specification, claims, and accompanying drawings of this application, the terms "first", "second", "third", "fourth", and the like are intended to distinguish between different objects but do not indicate a particular order. In addition, the terms "include" and "have" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that the embodiments described in the specification may be combined with another embodiment.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be understood that the embodiments of the present invention may be applied to various communication systems, for example, a global system for mobile communications (GSM for short), a code division multiple access (CDMA for short) system, a wideband code division multiple access (WCDMA for short) system, a general packet radio service (GPRS for short), a long term evolution (LTE for short) system, an advanced long term evolution (LTE-A for short) system, a universal mobile telecommunications system (UMTS for short), or a next-generation communication system such as a 5G communication system.

A conventional communication system usually supports a limited quantity of connections, and is easy to implement. However, with development of a communication technology, in addition to conventional communication, a mobile communication system supports, for example, device-to-device (D2D for short) communication, machine-to-machine (M2M for short) communication, machine type communication (MTC for short), and vehicle-to-vehicle (V2V for short) communication.

The embodiments are described with respect to a sending device and a receiving device in the embodiments of the present invention.

A terminal device may also be referred to as user equipment (UE for short), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (STA for short) in a wireless local area network (WLAN for short), or may be a cellular phone, a cordless telephone set, a session initiation protocol (SIP for short) phone, a wireless local loop (WLL for short) station, a personal digital assistant (PDA for short) device, a handheld device having a wireless communication function, a computing device or another processing device connected to a wireless modem, a vehicle-mounted device, a wearable device, a terminal device in a next-generation communication system such as a 5th generation (5G for short) communication network, a terminal device in a future evolved public land mobile network (PLMN for short), or the like.

As an example instead of a limitation, in the embodiments of the present invention, the terminal device may be a wearable device. The wearable device may also be referred to as a wearable intelligent device, and is a general term for wearable devices such as glasses, gloves, watches, clothes, and shoes that are developed by applying wearable technologies for intelligent designs of daily wear. The wearable device is a portable device that is directly worn on a body or integrated into clothes or an accessory of a user. The wearable device is not merely a hardware device, but is used to implement a powerful function through software support, data exchange, and cloud interaction. Generalized wearable intelligent devices include full-featured and large-sized devices that can implement complete or some functions without depending on smartphones, for example, smartwatches or smart glasses, and devices that focus on only one type of application function and need to work with other devices such as smartphones, for example, various smart bands or smart jewelry for monitoring physical signs.

In addition, the embodiments are described with respect to a network device in the embodiments of the present invention. The network device may be a device configured to communicate with a mobile device. The network device may be an access point (AP) in a WLAN or a base transceiver station (BTS for short) in GSM or CDMA, or may be a NodeB (NB for short) in WCDMA, or may be an evolved NodeB (eNB or eNodeB for short) in LTE, a relay station or an access point, a vehicle-mounted device, a wearable device, a gNodeB (gNB or gNodeB for short) in a future 5G network, a network device in a future evolved PLMN network, or the like.

In addition, in the embodiments of the present invention, the network device serves a cell. The terminal device communicates with the network device by using a transmission resource (for example, a frequency domain resource or a spectrum resource) used for the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, or the like. The cells are characterized by small coverage and low transmit power, and are adapted to provide high-rate data transmission services.

In addition, on a carrier in an LTE system or a 5G system, a plurality of cells may operate on a same frequency. In some special scenarios, it may also be considered that the carrier and the cell are equivalent in concept. For example, in a carrier aggregation (CA) scenario, when a secondary component carrier is configured for the terminal device, both a carrier index of the secondary component carrier and a cell identity (Cell ID) of a secondary serving cell that works on the secondary component carrier are carried. In this case, it may be considered that the carrier and the cell are equivalent in concept. For example, access to a carrier by the terminal device is equivalent to access to a cell by the terminal device.

A method and a related device provided in the embodiments of the present invention may be applied to a terminal device or a network device. The terminal device or the network device includes a hardware layer, an operating system layer running above the hardware layer, and an application layer running above the operating system layer. The hardware layer includes hardware such as a central processing unit (CPU for short), a memory management unit (MMU for short), and a memory (also referred to as a main memory). The operating system may be any one or more types of computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. Moreover, in the embodiments of the present invention, a specific structure of an entity for performing a control information transmission method is not specially limited in the embodiments of the present invention, provided that the entity can run a program including code of the control information transmission method in the embodiments of the present invention, to perform communication according to the control information transmission method in the embodiments of the present invention. For example, the entity for performing the control information transmission method in the embodiments of the present invention may be a terminal device or a network device, or a function module that is in a terminal device or a network device and that can invoke a program and execute the program.

In addition, aspects or features in the embodiments of the present invention may be implemented as a method, an apparatus, or a product that uses standard programming and/or engineering technologies. The term "product" used in this application covers a computer program that can be accessed from any computer readable component, carrier, or medium. For example, the computer readable medium may include but is not limited to a magnetic storage component (for example, a hard disk, a floppy disk, or a magnetic tape), an optical disc (for example, a compact disc (CD for short), or a digital versatile disc (DVD for short)), a smart card and a flash memory component (for example, an erasable programmable read-only memory (EPROM for short), a card, a stick, or a key drive). In addition, various storage media described in this specification may represent one or more devices and/or other machine-readable media that are configured to store information. The term "machine-readable medium" may include but is not limited to a radio channel, and various other media that can store, include, and/or carry an instruction and/or data.

Some terms in this application are described below, so that persons skilled in the art can have a better understanding.

(i) A data frame is a protocol data unit at a data link layer, and the data frame includes three parts: a frame header, a data part, and a frame trailer. The frame header and the frame trailer include some necessary control information such as synchronization information, address information, and error control information. The data part includes data, for example, an IP data packet, transmitted from a network layer.

(2) In terms of an aggregation level, a plurality of physical downlink control channels (PDCCH) may be transmitted in one subframe, one PDCCH includes n consecutive CCEs, and the aggregation level indicates a quantity n of consecutive CCEs occupied by one PDCCH.

(3) "A plurality of" means two or more. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

A 5G application scenario in which a technical problem can be resolved is first provided in this application. In the 5G scenario provided in this application, different types of services such as a URLLC service and an eMBB service need to be supported. However, the URLLC service has a significantly higher latency requirement than the eMBB service. Therefore, a single-transmission time (namely, a transmission time of one transport block) required by the URLLC service should be significantly less than a single-transmission time required by the eMBB service. If a conventional scheduling method is used to indicate the eMBB service and the URLLC service, the URLLC service may not be scheduled until eMBB data transmission is completed, and consequently, a required latency is exceeded (a timeout occurs and transmission fails) before the URLLC service is sent or when the URLLC service is just scheduled. In this case, an ultra-reliability requirement of the URLLC service cannot be met. If a frequency domain reservation method is used, to be specific, a reserved frequency domain resource is used to serve only the URLLC service, and the eMBB service is not scheduled on the frequency domain resource, to meet a transmission reliability requirement of some randomly arrived services in the URLLC service, a sufficiently large frequency domain resource (a time-frequency resource that can ensure transmission reliability of all data packets arriving at a peak) needs to be reserved, causing obvious resource waste.

Therefore, a technical problem to be resolved in this application is how to enable, by using an effective scheduling method, a URLLC service and an eMBB service to efficiently coexist. In addition, a method for scheduling the eMBB service and the URLLC service by using same or close time domain units as scheduling units is mainly discussed in this application, to resolve the problem of how to efficiently enable eMBB and URLLC to efficiently coexist. The following first specifically analyzes a major technical problem and difficulty in a solution in which same or close time domain units are used as scheduling units.

The single-transmission time required by the URLLC service is significantly less than that required by the eMBB service. Therefore, if the eMBB service and the URLLC service are scheduled by using same or close time domain units that can meet a transmission latency requirement and a reliability requirement of the URLLC service, a transmission latency requirement and a reliability requirement of the eMBB service can certainly be met. In addition, a wait time of a URLLC service data packet can be reduced, and a transmission latency of the URLLC data packet is further reduced. In this case, a transmission latency requirement and a reliability requirement for coexistence of eMBB and URLLC are met finally. Specifically, FIG. 1 is a schematic diagram of a specific application scenario in which eMBB and URLLC are transmitted by using same time domain units according to an embodiment of this application. FIG. 1 shows five same time domain units (for example, time domain symbols). The eMBB service and the URLLC service are scheduled by using same time domain units, so that a transmission latency requirement of randomly arrived URLLC services is met, in other words, a transmission latency requirement and a reliability requirement of each of the eMBB service and the URLLC service are met.

However, using the foregoing scheduling method has the following problem: A time domain scheduling unit that can meet a latency requirement of URLLC data transmission is certainly significantly less than a time domain scheduling unit that is usually used to schedule eMBB data, and using a very small time domain unit to schedule eMBB data transmission may increase overheads for transmission scheduling control information, and consequently, time-frequency resource utilization of the eMBB service is reduced. For example, if eMBB data transmission is scheduled by using a 1 ms time domain unit, a proportion of time-frequency resources used to carry scheduling-related control information usually reaches 20%. When a time domain scheduling unit is reduced, for example, from 1 ms to 0.125 ms, even if an optimized scheduling algorithm is used (for example, a quantity of eMBB terminal devices for which scheduling is performed on one time domain unit is minimized), the proportion of time-frequency resources used to carry scheduling-related control information also increases to 50%. In addition, each time domain unit may be used to schedule eMBB data transmission. Therefore, the eMBB terminal device may need to monitor related scheduling control information on each time domain unit. Therefore, a quantity of times of monitoring control information by the eMBB terminal device is increased, and power consumption of the eMBB terminal device is further increased. In conclusion, in a process of implementing efficient coexistence between a URLLC service and an eMBB service by reducing a time domain scheduling unit, how to minimize overheads for carrying control information and reduce power consumption of an eMBB terminal device is a technical problem and a difficulty to be mainly resolved in this application.

It should be emphasized that although this application is to resolve a problem that overheads for a time-frequency resource occupied for scheduling control information that are generated when a URLLC service and an eMBB service efficiently coexist, this application may also be applied to another scenario to reduce time-frequency resources used to carry control information or provide more flexible scheduling for a network device. For example, only an eMBB service is scheduled when there is no URLLC service. According to the implementation method in this application, a proportion of time-frequency resources used to carry control information in all time-frequency resources can be effectively reduced (relative to that when scheduling control information is sent on each time domain scheduling unit). In addition, in this case, an application scenario of this application is not limited to a relatively small time domain scheduling unit. For example, an available time-frequency resource in an LTE licensed-assisted access (LAA) application scenario is uncertain. According to the implementation method in this application, more flexible scheduling can be provided for the LAA application scenario, and a proportion of time-frequency resources used to carry control information in all time-frequency resources is reduced. For another example, in a future high-frequency scenario deployed in 5G, an antenna uses a relatively narrow beam to serve a terminal device. To expand coverage (a service scope), a direction of a beam of the antenna varies with time, and each beam has relatively short duration (for example, one or several time domain symbols). The relatively short duration of each beam is similar to the foregoing relatively small time domain scheduling unit. According to the implementation method in this application, a proportion of time-frequency resources used to carry control information in all time-frequency resources can be effectively reduced. For another example, a dedicated channel may be provided for a terminal device by using dedicated first physical layer control information, to notify the terminal device of control information content that is exclusive or has a security requirement. However, when control information is common, a common channel is provided to send the common control information to terminal devices with similar requirements or similar scheduling statuses or occasions. In this way, check or transmission resources can be reduced, thereby reducing related resources while ensuring scheduling security. In conclusion, an application scenario in which a URLLC service and an eMBB service coexist is merely an example, and the implementation method in this application is not limited thereto.

In addition, it should be understood that the time domain unit in this application may be a time domain symbol, a mini-slot, a slot, a subframe, or the like, and this is not specifically limited in this application. It should be specially noted that a time length (namely, a quantity of included time domain symbols) of the mini-slot may be fixed or may be flexibly changed.

Figure 2:
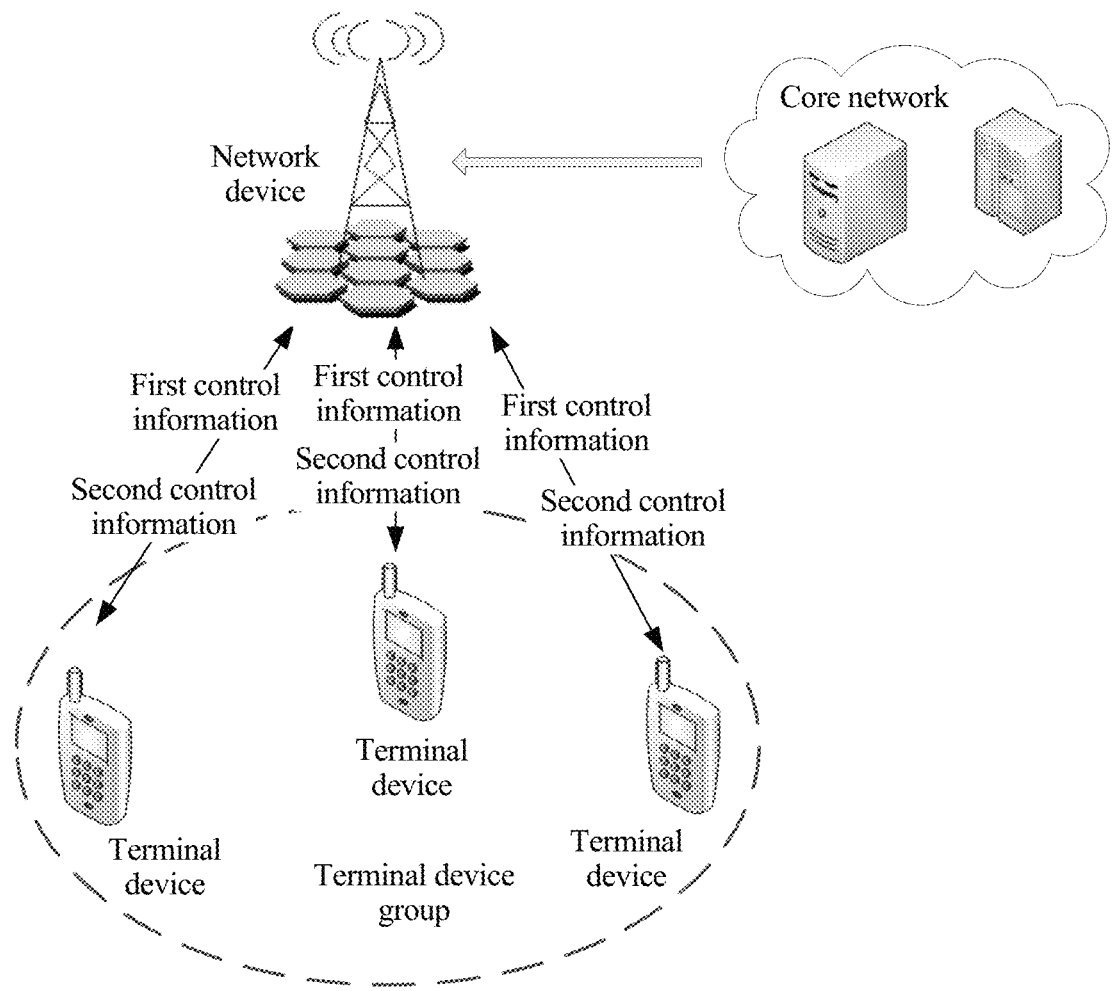
FIG. 2 is a diagram of a communication network architecture according to an embodiment of this application.

Based on the foregoing description, to facilitate understanding of the embodiments of this application, the following first describes a communication system architecture on which the embodiments of this application are based. FIG. 2 is a diagram of a communication system architecture according to an embodiment of this application. The communication system architecture includes a network device and a terminal device. As an example instead of a limitation, the network device schedules a resource for the accessing terminal device, and the terminal device transmits data by using the resource scheduled by the network device for the terminal device.

The terminal device may be a user-side device in the communication system, and can support an eMBB service, or support a URLLC service, or support both an eMBB service and a URLLC service. In addition, a resource used by the terminal device during communication is scheduled by the network device.

The network device may be a network-side network element in a 5G communication system, for example, a gNB in the 5G communication system. Specifically, the network device may send first physical layer control information to all terminal devices in a terminal device group to allocate temporary identifiers to the terminal devices. Further, the network device may send second physical layer control information to some or all of the terminal devices in the terminal device group. The first physical layer control information may carry fixed transmission scheduling control information of the terminal device within a valid time range, and the second physical layer control information may carry control information that can be flexibly changed and that can be used to finally determine whether transmission scheduling is to be truly performed for the terminal device. For example, within a period of valid time, the terminal device is notified, by using the first physical layer control information, of a time-frequency location and a modulation and coding scheme to be used to transmit data within the valid time. However, because an occasion on which the URLLC service randomly arrives in this application is uncertain, a resource that is pre-allocated to the terminal device in the first physical layer control information needs to be preferentially used to transmit the URLLC service, to ensure a transmission latency requirement of the service. Therefore, the terminal device needs to be notified, in real time by using the second physical layer control information, whether scheduling can be truly performed on a resource location indicated in the first physical layer control information, or that scheduling is performed after some adjustments are made based on an actual case. In addition, a granularity of time domain units obtained through division within the valid time range meets the transmission latency requirement of the URLLC service. Therefore, after main transmission scheduling control information is sent to the terminal device in the first physical layer control information, real-time and flexible scheduling is performed by using the second physical layer control information. In this way, finally, not only overheads required for sending control information on each time domain unit can be reduced, but also a latency requirement of an inserted random service can be met. For more detailed description, refer to descriptions in the following embodiments.

It should be noted that a communication system in this application may include an LTE system and a future evolved system of the LTE system, or may be a 5G new radio access technology in 3GPP (New Radio Access Technology in 3GPP, NR) system referred to as a 5GNR system. This is not specifically limited in this application. It may be understood that the communication system architecture in FIG. 2 is merely an example implementation in the embodiments of this application. A communication system architecture in the embodiments of this application includes but is not limited to the foregoing communication system architecture.

Based on the foregoing communication system architecture, the following analyzes and elaborates a general idea of how to specifically minimize overheads for carrying control information and reduce power consumption of an eMBB terminal device in this application.

In the prior art, after being delivered from a factory, a terminal device has at least one globally unique identifier such as an IMSI (International mobile subscriber identity) identity or an IMEI (International mobile equipment identity) identity. The globally unique identifier is represented by at least 48 binary digits. After the terminal device successfully accesses a network because the terminal device needs to be served, or after the terminal device successfully accesses a network through paging by a network device, the network device specifies a unique terminal device identifier for the terminal device. The terminal device identifier is valid in at least a cell currently served by the network device. In other words, in the cell currently served by the network device, terminal device identifiers are in a one-to-one correspondence with terminal devices. As an example instead of a limitation, the terminal device identifier may be a radio network temporary identifier (RNTI), or may be another identifier that can uniquely identify the terminal device in the cell. The terminal device identifier is usually indicated by at least 16 bits.

It is assumed that a terminal device #1 has one unique identifier (referred to as an identifier #1 for ease of description) that is valid in at least a current cell and one globally unique identifier (referred to as an identifier #2). After receiving control information, the terminal device #1 may determine, based on the identifier #1 or the identifier #2 of the terminal device, whether the received control information is control information of the terminal device. For example, the network device scrambles, by using the identifier #1, a cyclic redundancy check (CRC) bit of the control information to be sent to the terminal device #1, and the terminal device descrambles CRC by using the identifier #1, and after the descrambling, determines, by using the CRC bit, that an information bit in the received control information is correctly received. In this case, the terminal device determines that the control information sent by the network device is for the terminal device. A principle and a process of how the terminal device #1 specifically determines the control information of the terminal device #1 by using the identifier #1 is similar to a method, in the existing LTE system, in which the terminal device determines a PDCCH that is sent to the terminal device. A principle and a process of how to determine, by using the identifier #2, the control information of the terminal device #1 is similar to a method, in the existing LTE system, in which the terminal device in a non-connected mode (for example, an IDLE mode) determines whether a paging message sent by the network device is for the terminal device. Details are not described herein. It may be understood that regardless of whether the terminal device #1 identifies the control information of the terminal device by using the identifier #1 or the identifier #2, relatively high overheads are generated. Because each of the identifier #1 and the identifier #2 is at least 16 binary bits, and a quantity of bits is relatively large, overheads generated by the identifier are very obvious. In addition, as analyzed above, to implement efficient coexistence between an eMBB service and a URLLC service, a relatively small time domain scheduling unit (for example, a time domain symbol, a mini-slot, a slot, or a subframe) needs to be used, and control information is distributed in each time domain scheduling unit. Therefore, if quantities of bits of the identifier #1 and the identifier #2 are relatively large, resource overheads are greatly wasted.

Therefore, in the embodiments of this application, control information #1 indicates a temporary index #1 to the terminal device #1. "Temporary" means that the index #1 is valid within a period of time starting from receiving the control information #1 by the terminal device (or starting from a start location indicated by the control information #1), in other words, control information using the index #1 for indication within the duration is control information sent to the terminal device #1, and/or transmission data indicated by the index #1 is data sent to the terminal device #1 or data sent by the terminal device #1. Alternatively, within the duration, control information sent to the terminal device #1 is related to the index #1, and/or control information used to instruct the terminal device #1 to receive data or instruct the terminal device #1 to send data is related to the index #1. According to the embodiments of this application, a quantity of bits of an identifier of the terminal device that need to be used to send related control information is reduced (for example, the index #1 is used to temporarily replace the identifier #1 or the identifier #2), to reduce overheads for carrying control information and reduce power consumption of the eMBB terminal device, thereby implementing efficient coexistence between the eMBB service and the URLLC service.

It may be understood that how to reduce an increase in overheads for transmission scheduling control information that may be caused because a very small time domain unit is used to schedule eMBB data transmission is analyzed above merely by reducing a quantity of bits of a first index. This application further includes a solution for reducing control information overheads in another implementation. For example, a resource that is fixed within a specific time, for example, a time-frequency resource, is sent once in first physical layer control information, and actual scheduling information that can be flexibly changed is included in common second physical layer control information and sent a plurality of times, to avoid problems such as an increase in overheads that is caused by transmitting a same resource a plurality of times. For details, refer to the description in the following method embodiments. Details are not described herein again.

With reference to a control information receiving and sending method embodiment provided in this application, the following specifically analyzes and resolves the technical problem and the difficulty mentioned in this application.

Figure 3:
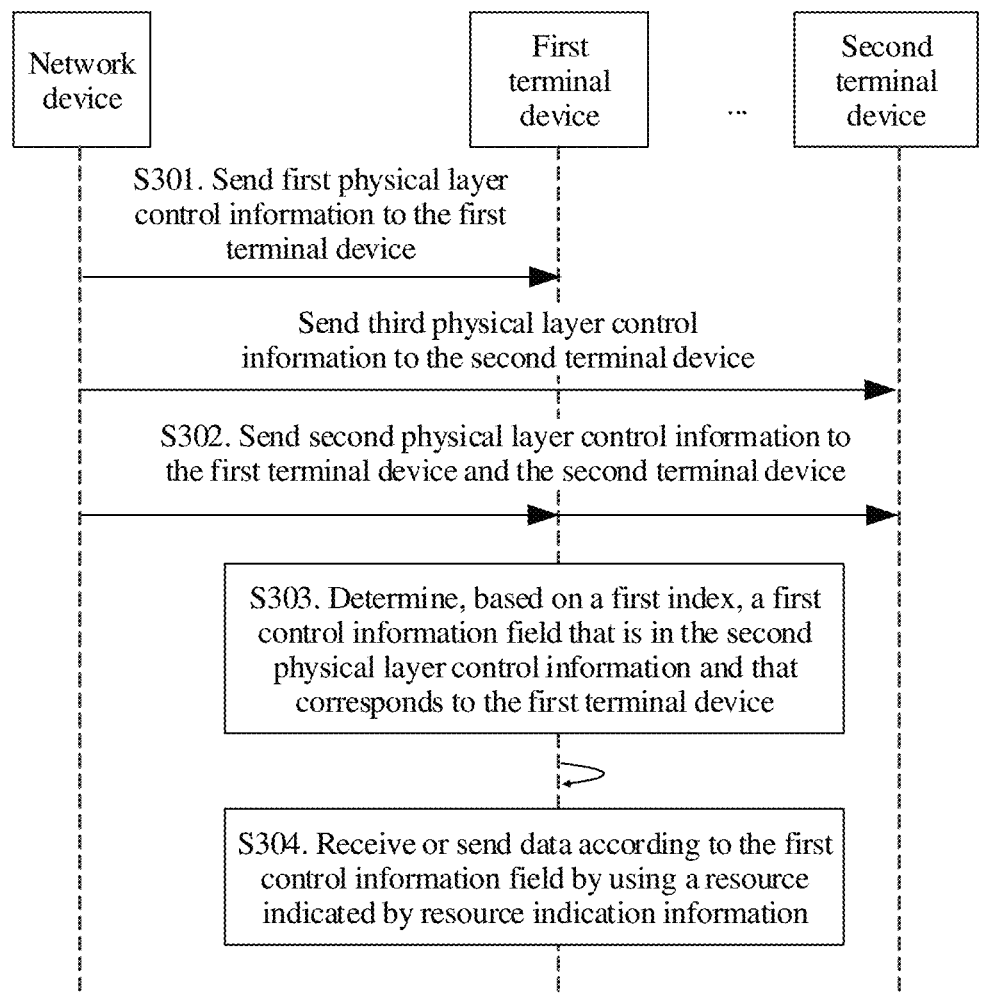
FIG. 3 is a schematic flowchart of a control information sending and receiving method according to an embodiment of this application.

FIG. 3 is a schematic flowchart of a control information processing method according to an embodiment of this application. The method may be applied to the communication system shown in FIG. 2. The following describes the method from a perspective of interaction between a network device and a terminal device with reference to FIG. 3. The method may include step S301 to step S303, and may optionally further include step S304.

Step S301: The network device sends first physical layer control information to a first terminal device, and the first terminal device receives the first physical layer control information sent by the network device.

Specifically, the first physical layer control information is used to indicate a first index to the first terminal device, and is used to instruct the first terminal device to monitor second physical layer control information within a first time period, and the first index corresponds to the first terminal device within the first time period, and is used by the first terminal device to determine a control information field that is in the second physical layer control information and that corresponds to the first terminal device.

In this application, the first terminal device (referred to as a terminal device #1) is a terminal device that has accessed a serving cell served by the network device. In other words, the first terminal device has obtained a user ID in the serving cell. For example, the user ID may be the foregoing identifier 1, or more specifically, may be an RNTI. The network device indicates the first index (referred to as an index #1) to the terminal device #1 by using the first physical layer control information (referred to as control information #1). The indication may be explicit or implicit, and this is not specifically limited in this application. The control information #1 is user equipment-specific (UE-specific) control information. In other words, the control information #1 is control information that is exclusively sent by the network device to the terminal device #1. The control information #1 is related to the user ID of the terminal device #1. The terminal device #1 determines, based on the user ID, that the control information #1 sent by the network device is for the terminal device #1.

Manners in which the first physical layer control information specifically indicates the first index to the first terminal device may include an explicit indication manner and an implicit indication manner.

The explicit indication manner is specifically described first. The control information #1 includes a field used to indicate the index #1. For example, the control information #1 includes a dedicated field to indicate the index #1, and a quantity of bits included in the dedicated field is related to a maximum quantity of terminal devices that can be supported by the network device. The "maximum quantity of terminal devices that can be supported" may also refer to a peak value of a quantity of transmitted data packets that can be supported by the network device. For example, if it is specified in a communication standard that the maximum quantity of supported terminal devices is 32, the dedicated field is 5 bits. Further, in actual network operation, the maximum quantity of terminal devices that can be supported by the network device may be configured by using radio resource control (RRC) signaling, for example, is configured as 16 or 8. Alternatively, another control information field in the control information #1 may be reused to indicate the index #1. In a possible implementation, the first physical layer control information includes a first field, and the first physical layer control information indicates the first index to the first terminal device by reusing the first field. The first field includes at least one of a modulation and coding scheme indication field, a new data indicator field, a redundancy version indication field, a transmit power control TPC indication field, and a HARQ process number indication field. Because an information field that can be reused is related to control information content, other than the index 1, indicated to the terminal device #1 in the control information #1, a specific implementation in which reused control information indicates the index #1 is further described later when content of the control information #1 is described in detail. Explicitly indicating the index #1 by the network device helps the terminal device #1 accurately understand the index #1.

Then the implicit indication manner is specifically described. The network device implicitly indicates the index #1 to the terminal device by using the control information #1 may be that the network device indicates the index #1 by using a time-frequency resource location used to send the control information #1. For example, the network device may specify S control resource sets. In a possible implementation, S is consistent with a maximum quantity of terminal devices that can be supported by the network device when the terminal device #1 receives the control information #1, and the terminal device #1 determines the index #1 based on an index of a control resource set in which the 1st control channel element (CCE) or the $1^{st}$ resource element group (REG) in the control information #1 received by the terminal device #1 is located. For example, if the $1^{st}$ CCE or the 1st REG in the control information #1 received by the terminal device #1 is located in the $2^{nd}$ control resource set, the terminal device #1 may determine that the index #1 indicated by the network device to the terminal device #1 by using the control information #1 is 2. Alternatively, if the 1st CCE or the 1st REG in the control information #1 received by the terminal device #1 is located in the $2^{nd}$ control resource set, the terminal device #1 may determine that the index #1 indicated by the network device to the terminal device #1 by using the control information #1 is 4. In this case, control resource set indexes are in a one-to-one correspondence with but different from indexes #1. The one-to-one correspondence may be specified in a communication standard, or may be configured by the network device for the terminal device #1 by using higher layer signaling. In another possible implementation, each control resource set may have L CCE or REG start points. The terminal device #1 determines the index #1 based on an index of a control resource set in which the 1st CCE or the $1^{st}$ REG in the control information #1 received by the terminal device #1 is located and a start point corresponding to the $1^{st}$ CCE or the $1^{st}$ REG in the L start points. For example, if the $1^{st}$ CCE or the $1^{st}$ REG in the control information #1 received by the terminal device #1 is located at the $3^{rd}$ CCE or REG start point in the $2^{nd}$ control resource set, the terminal device #1 may determine that the index #1 indicated by the network device to the terminal device #1 by using the control information #1 is (2−1)*L+(3−1). Alternatively, if the $1^{st}$ CCE or the $1^{st}$ REG in the control information #1 received by the terminal device #1 is located at the $3^{rd}$ CCE or REG start point in the $2^{nd}$ control resource set, the terminal device #1 may determine that the index #1 indicated by the network device to the terminal device #1 by using the control information #1 is (2−1)*L+3.

Optionally, the network device may calculate and generate a scrambling code by using the index #1 as a scrambling code calculation variable, and scramble, by using the calculated scrambling code, a signal of the control information

1 to be sent to the terminal device #1, so as to implicitly indicate the index #1 to the terminal device #1. For example, the network device calculates a scrambling code sequence by using at least the identifier #1 or an identifier #2 of the terminal device and the index #1, or calculates a scrambling code sequence by using at least the index #1. Then, by using the calculated scrambling code, the network device scrambles a CRC bit sequence of the control information #1 to be sent to the terminal device #1, or scrambles an information bit sequence of the control information #1, or scrambles an information bit and a CRC bit of the control information #1. Implicitly indicating the index #1 by the network device reduces time-frequency resources occupied by the control information #1.

In a possible implementation, the network device configures a maximum value of the first index by using higher layer signaling; or the network device configures, by using higher layer signaling, a quantity of bits or a quantity of significant bits included in a field corresponding to the first index. For example, as an example instead of a limitation, a quantity of binary bits used to indicate the index #1 may be 2, 3, 4, or the like configured by the network device by using higher layer signaling, or may be predefined. For example, the network device configures a binary bit used to indicate the index #1 for the terminal device by using RRC signaling, and "predefined" may mean pre-agreed in a communication standard, or may mean predefined before the terminal device/network device is delivered from a factory. It may be understood that the quantity of binary bits used to indicate the index #1 may also be expressed as a maximum quantity of terminal devices that are scheduled/supported/served by the network device within a valid period (namely, the first time period) of the index #1. For example, that the maximum quantity of terminal devices is 8 is equivalent to indicating (representing) the index #1 by using 3 binary bits. Therefore, the index #1 that is configured by using higher layer signaling or predefined may be a maximum quantity of terminal devices that is configured by using higher layer signaling or predefined. It should be noted that the maximum quantity of terminal devices that are scheduled/supported/served by the network device may be a quantity of terminal devices that are scheduled/supported/served in one cell, or may be a maximum quantity of terminal devices in a terminal device group that is allocated and served by the network device.

In an implementation of this application, a quantity of binary bits used to indicate the first index (the index #1) may be significantly less than that of the identifier #1 or the identifier #2. Therefore, based on the first index used to differentiate control information for different terminal devices within a preset time period, related time-frequency resource overheads can be reduced (overheads for indicating control information per se can be reduced), and a transmission latency requirement and a reliability requirement of each of an eMBB service and a URLLC service can be met, thereby implementing efficient coexistence between the eMBB service and the URLLC service.

In a possible implementation, the first terminal device belongs to a first terminal device group; and the first physical layer control information is further used to indicate a first group index, and the first group index is used to identify the first terminal device group. The first terminal device determines, based on the first group index, the first terminal device group to which the first terminal device belongs. In other words, the network device may further indicate the first group index to the terminal device by using the first physical layer control information, so that the terminal device determines, based on the first group index, the terminal device group to which the terminal device belongs. For ease of description, when the network device groups terminal devices, the network device, the terminal device #1, the control information #1, and a group index #1 (an example of the first group index) are used for description. Likewise, the network device may implicitly or explicitly indicate the group index #1 to the terminal device #1.

In the explicit indication method, the network device may indicate the group index #1 by using a dedicated field or by reusing another field. For details, refer to the manner in which the network device explicitly indicates the index #1. Details are not described herein again.

In the implicit indication method, the network device may indicate the group index #1 and the index #1 to the terminal device #1 through scrambling or by sending the control information #1 at a specific time-frequency location. For example, a scrambling code sequence is calculated by using at least the index #1 and the group index #1. For another example, the control information #1 is sent on a control resource set to indicate the group index #1, and the 1st CCE or REG is sent at a location in the set to indicate the index #1; or conversely, a control resource set in which the 1st CCE or REG is located is used to indicate the group index #1, and a start location of the 1st CCE or REG in the control resource set is used to indicate the index #1. Implementation details are similar to those in the method for explicitly or implicitly indicating the index #1. For simplicity of description, details are not described herein again. In a possible implementation, the network device configures a maximum value of the first group index by using higher layer signaling; or the network device configures, by using higher layer signaling, a quantity of bits or a quantity of significant bits included in a field corresponding to the first group index.

It should be noted that when the network device uses the control information #1 to indicate only the index #1 to the terminal device #1, terminal devices corresponding to different indexes #1 within a time period (for example, one or several transmission time domain units) may be considered as a group of terminal devices. In other words, within a time period, in the serving cell of the network device, there is only one group of terminal devices to which indexes #1 are allocated.

In addition, the first index and the first group index are merely illustrative examples, and may be a first identifier and a second identifier, a first device ID and a second device ID, or the like. The index (or the identifier, the device ID, or the like) is only used to identify, within the valid time range (the first time period) of the index, a terminal device to which the index is allocated.

It should be noted that when the at least one terminal device (namely, the terminal device group) includes only the first terminal device, it may be considered that the network device performs sending only to the first terminal device; or when the terminal device group includes a plurality of terminal devices (including the first terminal device), it may be considered that the network device performs sending to the plurality of terminal devices in the terminal device group. The following specifically describes how the network device determines, when indicating a group to which a terminal device belongs to the terminal device by using the first physical layer control information, terminal devices specifically included in the terminal device group, in other words, determines how to group terminal devices. When sending a control channel to a terminal device, the network device selects different aggregation levels for different terminal devices based on channel conditions of the different terminal devices, to ensure transmission reliability of the control channel. Optionally, in the implementation method in this application, the network device may select an aggregation level based on a terminal device with worst transmission channel quality. In this way, the network device may send same second physical layer control information to terminal devices with different transmission quality, to ensure that a probability of correctly receiving the second physical layer control information by each terminal device in a group exceeds a target correct reception probability. For example, if a terminal device with an aggregation level 1 and a terminal device with an aggregation level 2 are classified into a group, the aggregation level 2 may be used to send the second physical layer control information; or if a terminal device with an aggregation level 1 and a terminal device with an aggregation level 8 are classified into a group, the aggregation level 8 may be used to send the second physical layer control information. In the latter method, using the aggregation level 8 to send the second physical layer control information to the terminal device with the aggregation level 1 reduces utilization of a time-frequency resource used to send the second physical layer control information. Therefore, further, the network device may classify terminal devices with close corresponding aggregation levels into a terminal device group, thereby increasing utilization of a time-frequency resource used to send the second physical layer control information, to avoid unnecessary waste caused by sending the second physical layer control information. Optionally, the network device may classify terminal devices with similar service types into a group, and serve a group of terminal devices with similar service transmission requirements by using similar transmission scheduling frequencies, transmission latencies, and transmission reliability. Alternatively, the network device may classify terminal devices with close identifiers #1 or identifiers #2 into a group, so as to indicate a group index #1 to the terminal devices. For example, the group index #1 is indicated only by using some least significant bits of the identifier #1 or the identifier #2.

The following specifically describes how the first time period is defined. In a possible implementation, the network device predefines the first time period; or the network device configures the first time period by using higher layer signaling (for example, RRC signaling); or the network device expressly indicates the first time period by using a control information field in the first physical layer control information. For example, the first time period is predefined in a communication standard or predefined before the network device and/or the terminal device #1 are or is delivered from a factory. This is not specifically limited in this application. For example, it may be predefined in the communication standard that the first time period corresponding to the control information #1 is 1 ms, one subframe, or one slot.

Then, how the network device indicates the first time period by using the first physical layer control information is described. The first time period may be a first time period of the first index (the index #1) indicated alone by the network device to the first terminal device (for example, the terminal device #1); or may be a first time period of the first index (the index #1) and the first group index (the group index #1) that are indicated by the network device; or may be a first time period within which the first terminal device is instructed to monitor the second physical layer control information. In other words, the terminal device may monitor control information #2 within the indicated first time period by using the index #1 and the group index #1. Therefore, the first time period in this application has a plurality of functions. First, the first time period may be used to indicate a valid time range of the first index. Second, the first time period may be used to indicate a valid time range of the first index and the first group index. Third, the first time period may be used to indicate a time range within which the network device may send the second physical layer control information related to the first index and/or the first group index to the first terminal device and a time range within which the first terminal device monitors the second physical layer control information.

For example, the network device may indicate a quantity of time domain units (for example, F time domain units) to the terminal device. The F time domain units indicate that a time period from a time domain unit (the time domain unit is the first time domain unit) on which the control information #1 is located to the $F^{th}$ time domain unit is the first time period. If a time division duplex (TDD) mode is used in a system, the F time domain units may indicate that a time period from a time domain unit (the time domain unit is the first time domain unit) on which the control information #1 is located to the $F^{th}$ downlink time domain unit location is the first time period. A specific meaning of the time domain unit has been described in this application, and is not described herein again. For another example, the F time domain units may start from the first time domain unit after a time domain unit on which the control information #1 is located, or may be another time domain unit that is specified in a communication standard and that is calculated by using the control information #1 as a reference point.

It should be noted that the first time period within which the terminal device monitors the second physical layer control information may be different from a fourth time period within which the first index is valid. For example, when the first physical layer control information and the second physical layer control information are used to instruct the terminal device to send data to the network device, in other words, when the first physical layer control information and the second physical layer control information are used to schedule uplink transmission, the terminal device monitors the second physical layer control information within the first time period based on the first index, and sends, within the fourth time period according to the instruction of the second physical layer control information, data indicated by the first index. In this case, a start location of the first time period precedes a start location of the fourth time period. A sending time of the second physical layer control information is earlier than a time at which the terminal device truly needs to send uplink data by using the first index. In other words, the network device sends the second physical layer control information to the terminal device in advance, so that the terminal device has a short period of time to make "full preparation" for sending uplink data on a subsequent or nearby time domain unit.

In a possible implementation, the first physical layer control information may have a same control information format as control information usually used to directly schedule the terminal device to receive downlink data or send uplink data. The "control information usually used to directly schedule the terminal device" is similar to a physical downlink control channel that is in an LTE system and that is used to schedule the terminal device to receive downlink data or send uplink data, and therefore belongs to the prior art that may be understood by persons skilled in the art. Details are not described herein, and the control information is referred to as usual scheduling control information. The usual scheduling control information indicates a specific time-frequency resource location for sending or receiving data to the terminal device when being used to schedule the terminal device to send or receive data. In an example of the implementation method in the present invention, the first physical layer control information indicates a time-frequency resource to the terminal device by using a same method as the usual scheduling control information. A time domain range corresponding to the time-frequency resource is the valid time range (the first time period) of the first index (or the first index and the first group index). A frequency domain range corresponding to the time-frequency resource is a frequency domain range that corresponds to a time domain unit corresponding to the second physical layer control information and within which the terminal device receives downlink data or sends uplink data, after the terminal device determines that the second physical layer control information includes instruction information for instructing the terminal device to receive downlink data or send uplink data. In addition, the first physical layer control information may indicate the first index or the first index and the first group index to the terminal device by using the foregoing method for reusing a usual scheduling control information field (for example, an MCS field, an NDI field, a HARQ process field, or an RV field).

Step S302: The network device sends the second physical layer control information to the at least one terminal device within the first time period, and the first terminal device receives, within the first time period, the second physical layer control information sent by the network device.

Specifically, the at least one terminal device includes the first terminal device, the second physical layer control information includes at least one control information field, the at least one control information field includes a first control information field, and the first control information field is used to instruct the first terminal device to receive or send data, or the first control information field is used to instruct the first terminal device to receive or send data or not to receive or send data.

In this application, the network device sends the at least one control information field to the at least one terminal device. Therefore, a quantity of terminal devices may be unequal to a quantity of control information fields. Assuming that the at least one terminal device includes X terminal devices, and the at least one control information field includes Y control information fields, where both X and Y are positive integers, there may be the following three cases for discussion.

Case 1: If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data.

Specifically, in Case 1 in which a quantity of terminal devices is equal to a quantity of control information fields, there are also two cases. In Case 1, service scheduling is required for each of the X terminal devices, in other words, each of the X terminal devices needs to receive or send data. In this case, the control information field is used to instruct to perform reception or sending. In Case 2, if not all the X terminal devices need to receive or send data, but each of the X terminal devices has a corresponding control information field, it indicates that the control information field is further used to instruct the terminal device not to receive or send data. In other words, in this case, each terminal device has a corresponding control information field, and regardless of whether service scheduling is to be performed for the terminal device, the terminal device needs to read the control information field corresponding to the terminal device to perform determining, and service scheduling is performed based on a determining result.

Case 2: If Y is less than X, the first control information field is used to instruct the first terminal device to receive or send data.

Specifically, when Y is less than X, it indicates that a terminal device in the X terminal devices that receive the second physical layer control information has no corresponding control information field in the second physical layer control information. In this case, the first control information field is merely used to instruct the first terminal device to receive or send data, and another manner or other information is required to instruct the terminal device not to receive or send data.

In a possible implementation, a control information field of a terminal device may not be included in the second physical layer control information, to instruct the terminal device not to receive or send data. For example, the X terminal devices further include a second terminal device. The network device sends third physical layer control information to the second terminal device, where the third physical layer control information is used to indicate a second index to the second terminal device, and is used to instruct the second terminal device to monitor fourth physical layer control information within a second time period, the second index is used by the second terminal device to determine a control information field that is in the fourth physical layer control information and that corresponds to the second terminal device, the fourth physical layer control information is the second physical layer control information within a third time period which is an overlapped part of the first time period and the second time period, and within the third time period, if Y is less than X, and the Y control information fields do not include the control information field corresponding to the second terminal device, the second physical layer control information is used to instruct the second terminal device not to receive or send data. In other words, the second physical layer control information includes the control information field of the first terminal device, and does not include the control information field of the second terminal device. The corresponding control information field included in the second physical layer control information is used to instruct the first terminal device to receive or send data. The second physical layer control information does not include the control information field corresponding to the second physical layer control information, to indicate that the second terminal device does not need to receive or send data. It should be noted that in this case, the second terminal device also receives the second physical layer control information, and therefore, the fourth physical layer control information is actually the second physical layer control information within the third time period which is an overlapped part of the second time period and the first time period.

Case 3: If Y is greater than X, the first control information field is used to instruct the first terminal device to receive or send data or not to receive or send data.

Specifically, if Y is greater than X, it indicates that a quantity of control information fields is greater than a quantity of terminal devices. In this case, it can only indicate that the control information field is preset at the beginning, in other words, the quantity of control information fields is fixed. In this case, each terminal device has a corresponding control information field, and remaining control information fields may be empty or may be preset bits. Therefore, when each terminal device has a corresponding control information field, it may be considered that the first control information field can be used to instruct the first terminal device to receive or send data or not to receive or send data.

Based on Case 1, Case, 2, and Case 3, in a possible implementation, the network device predefines a value of Y. In this case, the first control information field is used to instruct the first terminal device to receive or send data or not to receive or send data. For a reason, refer to the descriptions in Case 1, Case 2, and Case 3. Details are not described herein again. Alternatively, the network device sends higher layer signaling to the first terminal device, where the higher layer signaling is used to indicate a value of Y, and in this case, the value of Y may be flexibly changed.

When the first terminal device belongs to the first terminal device group, and the first physical layer control information is further used to indicate the first group index, in a possible implementation, the second physical layer control information is scrambled by using a first scrambling code sequence, and the first scrambling code sequence is calculated by using at least the first group index or a cell ID. The network device may use a dedicated identifier or a dedicated scrambling code of the control information #2 (an example of the second physical layer control information) to indicate that the control information is the control information #2, so as to distinguish the control information from the control information #1 or other control information. The dedicated identifier may be a control information format/index/indication/flag, or the like. The dedicated scrambling code may be a scrambling code sequence calculated based on a cell ID or a carrier ID. Specifically, a CRC bit sequence of the control information #2 may be scrambled, or an information bit sequence of the control information #2 may be scrambled, or an information bit and a CRC bit of the control information #2 may be scrambled. Alternatively, the network device may calculate the scrambling code sequence based on a cell ID (or a carrier ID) and an index (for example, one or more of a mini-slot index, a slot index, a subframe index, and a frame index) of a time domain unit on which the control information #2 is located. The terminal device may descramble the second physical layer control information by using the first group index (for example, the group index #1) obtained from the first physical layer control information, to identify whether the second physical layer control information is second physical layer control information sent to the terminal device group to which the terminal device belongs.

In a possible implementation, that the network device sends the second physical layer control information to the at least one terminal device within the first time period is specifically that the network device sends the second physical layer control information in common search space within the first time period, where the common search space is search space that is common to the at least one terminal device or common to a serving cell. Correspondingly, the first terminal device receives, within the first time period, the second physical layer control information sent by the network device in the common search space, where the common search space is search space that is common to the terminal device group to which the first terminal device belongs or common to a serving cell, and the terminal device group includes at least the first terminal device.

From a perspective of the terminal device, after the first terminal device (the terminal device #1) determines the first index (the index #1) based on the first physical layer control information (the control information #1), the first terminal device monitors the second physical layer control information (the control information #2) within the first time period by using the index #1. The control information #2 is sent to at least the terminal device #1, and the control information #2 may also be sent to other terminal devices such as a terminal device #2 and a terminal device #3. In other words, the control information #2 may be sent to a plurality of terminal devices. A CRC check bit such as 16 CRC check bits, 24 CRC check bits, or another quantity of CRC check bits needs to be added to each piece of control information, so that a terminal device that receives control information can determine whether the control information received by the terminal device is correct. For example, if the control information #2 is sent to only one terminal device, referring to the existing LTE system, at least 16 CRC check bits need to be added to the control information #2, so that the terminal device that receives the control information #2 can determine, by using the CRC check bits, whether the received control information is correct. According to the implementation of this application, the control information #2 may be sent to a plurality of terminal devices, only one CRC needs to be added to the control information #2, and all terminal devices that receive the control information #2 can determine, by using the CRC, whether the received control information is correct. In this way, time-frequency resources used to send the control information #2 can be effectively reduced. Further, the terminal device #1 may determine, by using a dedicated identifier or a dedicated scrambling code, whether the control information #2 is sent to the terminal device #1 or the terminal device group to which the terminal device #1 belongs, in other words, the terminal device #1 may determine whether the terminal device #1 is a potential terminal device that receives the control information #2.

Further, how the terminal device monitors the first physical layer control information and the second physical layer control information is specifically described. It is assumed that the first terminal device monitors the first physical layer control information at intervals of M time domain units, and monitors the second physical layer control information at intervals of N time domain units, where both M and N are positive integers greater than or equal to 1. Values of M and N may be configured by the network device by using higher layer signaling (for example, RRC signaling), or may be predefined, for example, predefined in a communication standard or preset before the network device and/or the terminal device are or is delivered from a factory.

In a specific application scenario, for example, total duration of the M time domain units is 1 ms or 0.5 ms, and N is equal to 1. For example, the total duration of the M time domain units is 1 ms, a 15 kHz subcarrier spacing is used, one time domain unit is one mini-slot including two time domain symbols, and M is equal to 7. For another example, the total duration of the M time domain units is 0.5 ms, a 15 kHz subcarrier spacing is used, one time domain unit is one mini-slot, M is equal to 3, and three mini-slots included in each 0.5 ms respectively include two, two, and three time domain symbols, or respectively include three, two, and two time domain symbols. For another example, the total duration of the M time domain units is 1 ms, a 30 kHz subcarrier spacing is used, one time domain unit is one slot, M is equal to 4, each slot includes seven time domain symbols, and duration of one slot is 0.25 ms. For another example, the total duration of the M time domain units is 1 ms, a 60 kHz subcarrier spacing is used, one time domain unit is one slot, M is equal to 8, each slot includes seven time domain symbols, and duration of one slot is 0.125 ms. The foregoing examples of M and N are merely intended to facilitate understanding of content of this application, and this is not specifically limited in this application. For another example, according to a specification in a communication standard protocol, the terminal device may understand that an end time of the valid time range of the index #1 (or the index #1 and the group index #1) precedes a next time domain unit on which the first physical layer control information may be received (in other words, precedes a next time domain unit for monitoring a first control channel by the terminal device), and a start time may be a time domain unit on which the first physical layer control information is located or a next time domain unit of a time domain unit on which the first physical layer control information is located or a time domain unit specified in the first physical layer control information. Alternatively, according to a specification in a communication standard protocol, the terminal device may understand that an end time of the valid time range of the index #1 (or the index #1 and the group index #1) precedes a next time domain unit on which the first physical layer control information is to be received (in other words, precedes a next time domain unit on which the first physical layer control information detected by the terminal device is located), and a start time may be a time domain unit on which the first physical layer control information is located or a next time domain unit of a time domain unit on which the first physical layer control information is located or a time domain unit specified in the first physical layer control information.

Optionally, the value M is greater than the value N. The network device prepares to schedule the terminal device to receive downlink data or send uplink data, and configures a part of scheduling-related information for the terminal device by using the first physical layer control information. After receiving the first physical layer control information, the terminal device monitors the second physical layer control information at a higher frequency than the first physical layer control information. In other words, an interval for monitoring the second physical layer control information by the terminal device is shorter than an interval for monitoring the first physical layer control information. The network device actually schedules, by using the second physical layer control information, the first terminal device to receive downlink data or send uplink data. In this way, even if a scheduling unit is a relatively small time domain unit, time-frequency resources used to send control information is not significantly increased. For example, when there is no data transmission, the first terminal device monitors the first physical layer control information at relatively long intervals, and when the network device prepares (plans) to schedule data transmission (uplink data sending or downlink data reception) corresponding to the terminal device, the terminal device monitors the second physical layer control information at relatively short intervals to obtain scheduling information in a timely manner. In this way, energy used by the terminal device to monitor control information is effectively reduced while same scheduling efficiency is ensured. In other words, even if a scheduling unit is a relatively small time domain unit, energy consumed when the terminal device monitors control information is not significantly increased according to this scheduling method. Still further, M relatively small time scheduling units are equivalent to one relatively large time scheduling unit, and a time-frequency resource used for the first physical layer control information is equivalent to a time-frequency resource used for control information when a relatively large time scheduling unit is used. According to the foregoing method in which common control information is used as the second physical layer control information, overheads for only one CRC are consumed to schedule a plurality of terminal devices, without indicating relatively long identifiers (for which more bit information is used) of the terminal devices, thereby effectively reducing time-frequency resources used for the second physical layer control information. In conclusion, according to the implementation method in this application, even if a relatively small time scheduling unit is used, time-frequency resources used to transmit control information are not significantly increased, time-frequency resources for monitoring control information by the terminal device by using the relatively small time scheduling unit can be equivalent to those for monitoring control information by using a relatively large time scheduling unit, and a better scheduling opportunity can be provided. To better reduce time-frequency resources occupied for the second physical layer control information, the first physical layer control information may carry as much scheduling-related indication information as possible.

Specific sequence locations for monitoring first physical layer control information and second physical layer control information are specifically described with reference to FIG. 4 to FIG. 8. It should be noted that an upper diagram and a lower diagram in each of FIG. 4 to FIG. 8 correspond to same time domain, and are described from perspectives of the first physical layer control information and the second physical layer control information respectively merely for ease of description.

Figure 4:
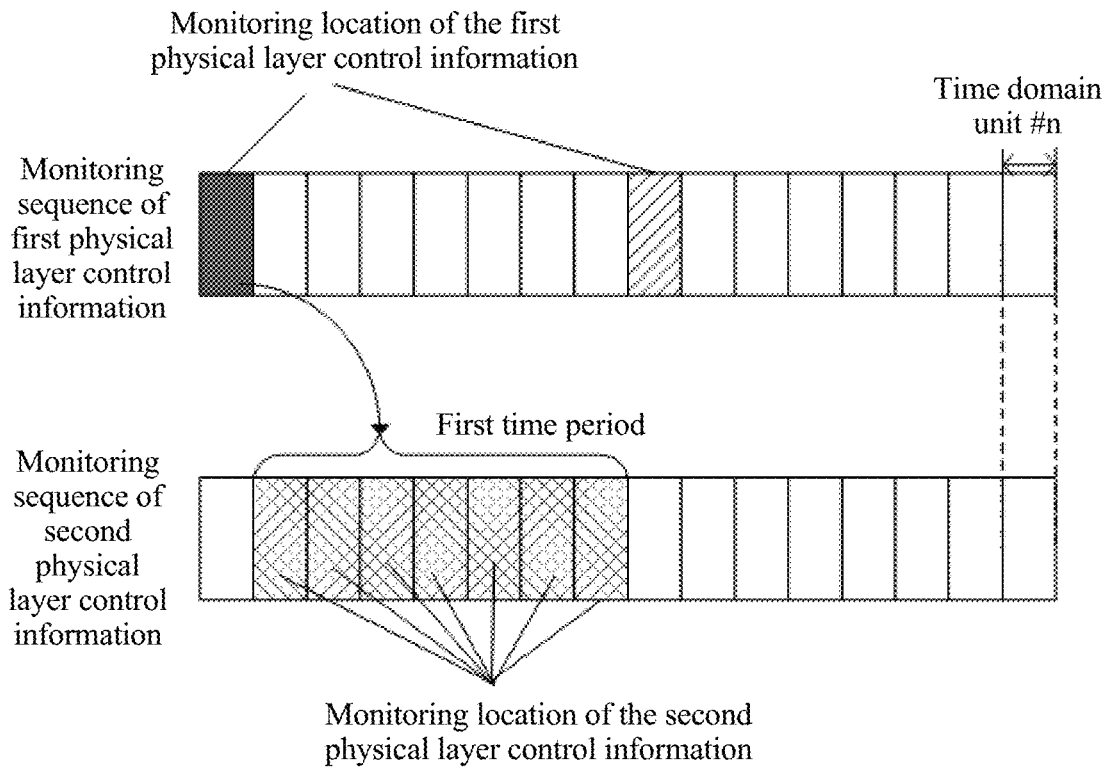
FIG. 4 is a monitoring sequence diagram of first physical layer control information and second physical layer control information according to an embodiment of this application.

FIG. 4 is a monitoring sequence diagram of first physical layer control information and second physical layer control information according to an embodiment of this application. The first time domain unit in the sequence diagram in FIG. 4 is a location on which the terminal device monitors the first physical layer control information. After detecting the first physical layer control information, the terminal device monitors the second physical layer control information within a first time period (the second time domain unit to the eighth time domain unit). Then the terminal device continues to monitor the first physical layer control information at a time (the ninth time domain unit) of monitoring the first physical layer control information.

Figure 5:
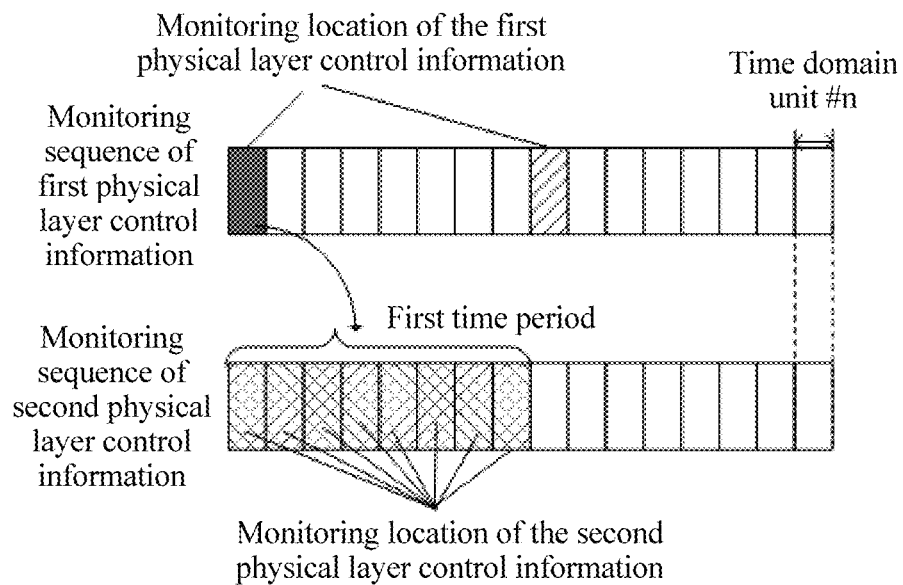
FIG. 5 is another monitoring sequence diagram of first physical layer control information and second physical layer control information according to an embodiment of this application.

FIG. 5 is another monitoring sequence diagram of first physical layer control information and second physical layer control information according to an embodiment of this application. FIG. 5 differs from FIG. 4 in that after the first physical layer control information is detected on the first time domain unit, the corresponding second physical layer control information may start to be immediately searched for through monitoring on another frequency domain unit in this time domain unit. In other words, the first physical layer control information and the second physical layer control information may be sent in different frequency domain units in a same time domain unit.

Figure 6:
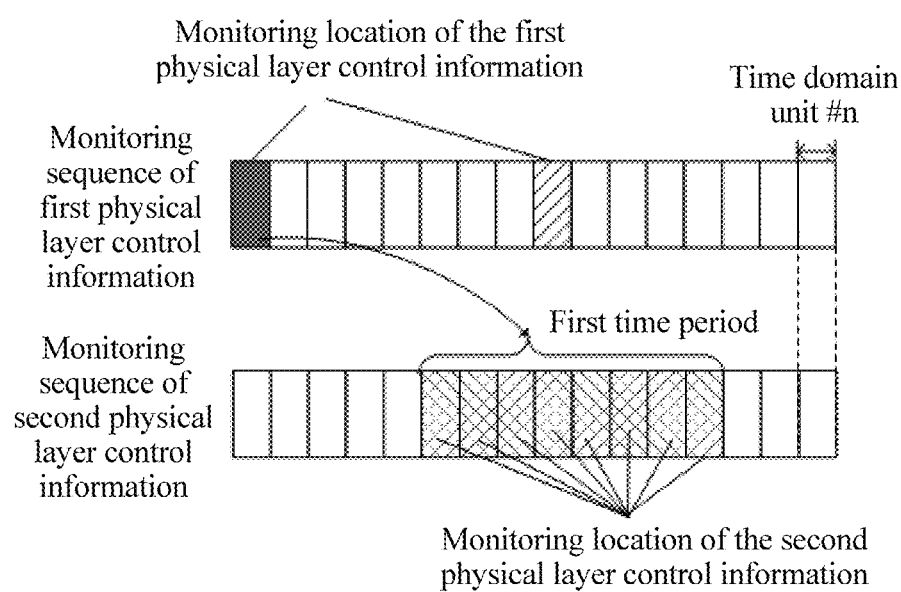
FIG. 6 is still another monitoring sequence diagram of first physical layer control information and second physical layer control information according to an embodiment of this application.

FIG. 6 is still another monitoring sequence diagram of first physical layer control information and second physical layer control information according to an embodiment of this application. FIG. 6 differs from FIG. 4 and FIG. 5 in that a time of receiving the first physical layer control information may be spaced apart from a start time of a first time period by a plurality of time domain units.

Figure 7:
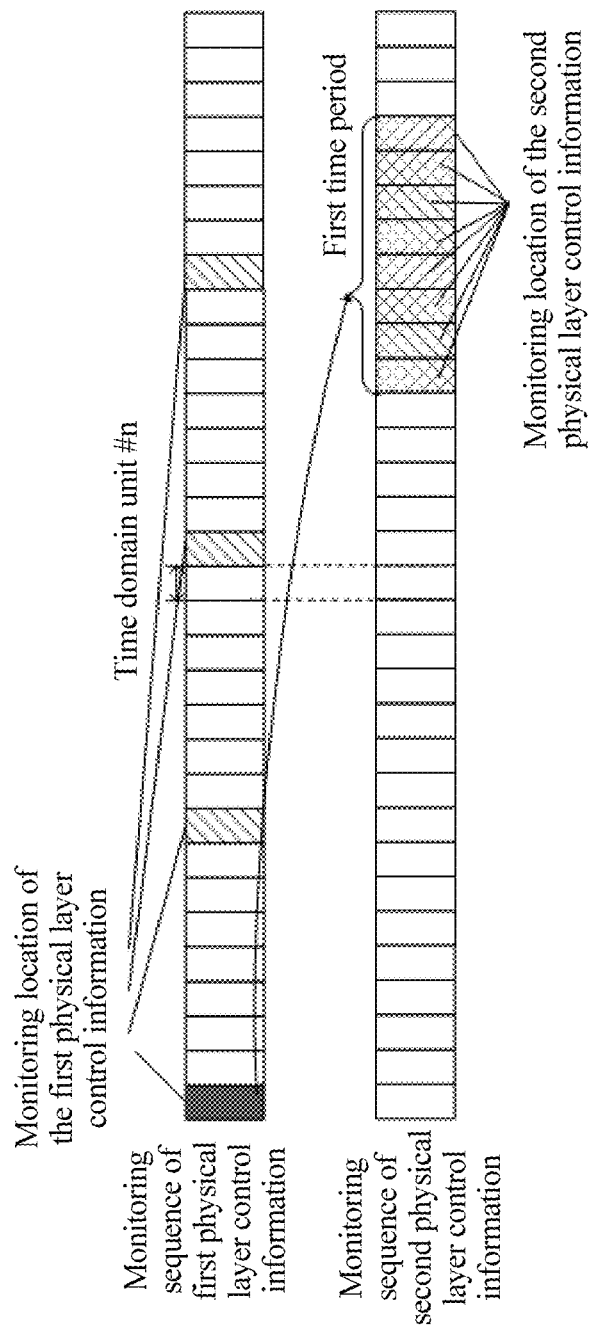
FIG. 7 is still another monitoring sequence diagram of first physical layer control information and second physical layer control information according to an embodiment of this application.

FIG. 7 is still another monitoring sequence diagram of first physical layer control information and second physical layer control information according to an embodiment of this application. FIG. 7 differs from FIG. 6 in that a time of receiving the first physical layer control information may be spaced apart from a start time of a first time period by more time domain units or even by several intervals for monitoring the first physical layer control information.

Figures 8, 9:
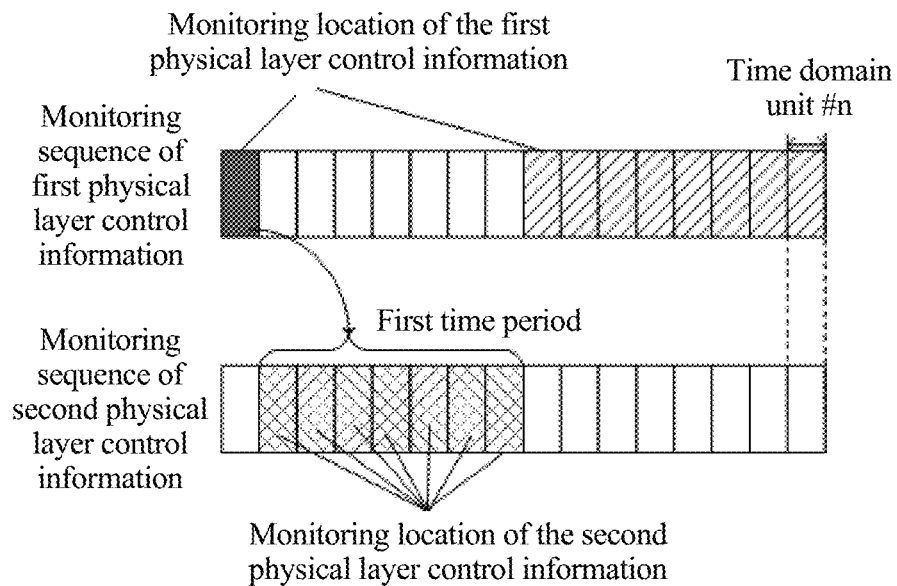
FIG. 8 is still another monitoring sequence diagram of first physical layer control information and second physical layer control information according to an embodiment of this application.
FIG. 9 is a schematic diagram of a specific application scenario of a control information sending and receiving method according to an embodiment of this application.

FIG. 8 is still another monitoring sequence diagram of first physical layer control information and second physical layer control information according to an embodiment of this application. FIG. 8 differs from FIG. 4 in that a time of receiving the first physical layer control information may be any time domain unit other than a first time period. In other words, provided that the second physical layer control information is detected, the first physical layer control information does not need to be monitored in the corresponding first time period; or if the second physical layer control information is not detected, the first physical layer control information may be monitored on each time domain unit, or certainly, the first physical layer control information may be monitored at intervals of a specific time domain unit. This is not specifically limited in this application.

With reference to FIG. 4 and FIG. 8, the foregoing describes several possible implementations for specific monitoring sequence locations of the first physical layer control information and the second physical layer control information. It may be understood that this application further includes other possible implementations, and the other possible implementations are not listed herein one by one.

In conclusion, it may be understood that the network device sends the first physical layer control information to the first terminal device, to allocate a temporary identifier (the index #1) to the terminal device, and the network device sends the second physical layer control information to the terminal device, to instruct the terminal device to receive downlink data or send uplink data or not to transmit any data. Further, the downlink data or the uplink data is data exclusive to the terminal device. In other words, the downlink data or the uplink data is not broadcast information or system information.

Step S303: The first terminal device determines, based on the first index, the first control information field that is in the second physical layer control information and that corresponds to the first terminal device.

Specifically, the first terminal device needs to determine whether the control information #2 includes the control information field sent to the first terminal device. With reference to example implementations, the following specifically describes how the terminal device #1 determines, based on the index #1, whether the control information #2 includes the control information field sent to the terminal device #1, and further determines control information content sent to the terminal device.

Manner 1

Figure 10:
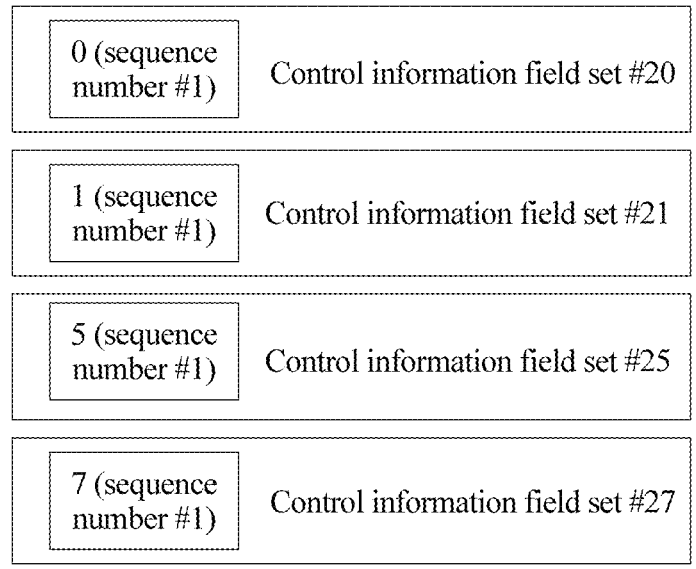
FIG. 10 is a schematic diagram of another specific application scenario of a control information sending and receiving method according to an embodiment of this application.

In Manner 1, the second physical layer control information (the control information #2) includes a control information field of each terminal device in the first terminal device group, and a quantity Y of control information fields is consistent with a quantity X of terminal devices that need to be indicated this time. For example, if the network device determines that two terminal devices need to be indicated this time, the control information #2 includes two control information fields, and each control information field corresponds to one indicated terminal device; or if four terminal devices need to be indicated this time, the control information #2 includes four control information fields, and each control information field corresponds to one indicated terminal device. A beneficial effect of Manner 1 is that when a quantity of indicated (scheduled) terminal devices is relatively small, time-frequency resources occupied for the control information #2, that is, time-frequency resources used to send the control information #2, can be effectively reduced. A specific application scenario corresponding to Manner 1 is shown in FIG. 9. FIG. 9 is a schematic diagram of a specific application scenario of a control information sending and receiving method according to an embodiment of this application. A maximum quantity of terminal devices that can be currently supported by the network device is 8 (in other words, a quantity of bits used to indicate the index #1 in the control information #1 is 3, or a value of the index #1 is an integer ranging from 0 to 7), and the current scheduling control information #2 is used to indicate four terminal devices corresponding to an index 0, an index 1, an index 5, and an index 7. The control information #2 includes four control information fields, and an index #1 field of a terminal device is included before each set, in other words, each control information field is indicated by a corresponding index #1 field. Another specific application scenario corresponding to Manner 1 is shown in FIG. 10. FIG. 10 is a schematic diagram of another specific application scenario of a control information sending and receiving method according to an embodiment of this application. An index #1 corresponding to each control information field may be explicitly included in the control information field. Alternatively, each control information field may be scrambled by using a scrambling code sequence calculated based on at least an index #1 of the control information field. In addition to calculating the scrambling code sequence based on the index #1, an identifier #1 or an identifier #2 of an indicated terminal device may be used as a calculation parameter. Alternatively, the scrambling code sequence is calculated based on at least the index #1, an identifier #1 or an identifier #2 of an indicated terminal device, and an index (for example, one or more of mini-slot index, a slot index, a subframe index, and a frame index) of a time domain unit on which the control information #2 is located.

Optionally, when the quantity Y of control information fields varies with the quantity X of terminal devices that need to be indicated this time, the network device may send fifth control information to indicate the quantity Y of fields included in the second physical layer control information. The terminal device may detect the second physical layer control information based on the quantity Y of fields indicated in the fifth control information. According to the implementation, calculation complexity of detecting the second physical layer control information by the terminal device is reduced.

Manner 2

Figure 11:
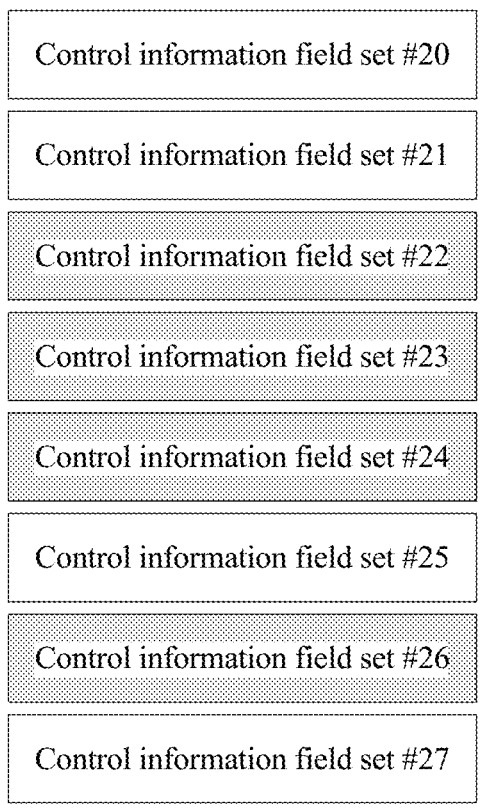
FIG. 11 is a schematic diagram of still another specific application scenario of a control information sending and receiving method according to an embodiment of this application.

In Manner 2, the second physical layer control information includes a control information field of each terminal device in the first terminal device group, and a quantity Y of control information fields is consistent with a maximum quantity of terminal devices that can be currently supported by the network device, or is consistent with a maximum quantity of supported terminal devices that is configured by the network device by using RRC signaling. In other words, the quantity Y of control information fields included in the control information #2 is fixed regardless of a quantity of terminal devices to be indicated in current scheduling by the network device. For example, if the maximum quantity of terminal devices that can be currently supported by the network device is 8, the control information #2 includes eight control information fields regardless of a quantity of terminal devices to be indicated in current scheduling. A specific application scenario corresponding to Manner 2 is shown in FIG. 11. FIG. 11 is a schematic diagram of still another specific application scenario of a control information sending and receiving method according to an embodiment of this application. Control information fields are arranged in order, the maximum quantity of terminal devices that can be currently supported by the network device is 8, and the current scheduling control information #2 is used to indicate four terminal devices corresponding to an index 0, an index 1, an index 5, and an index 7. A set 20, a set 21, a set 25, and a set 27 include content (namely, indication information or an indication information set to be sent to a corresponding terminal device), and other sets include no content (all control information bits are set to 0 or a default value). In FIG. 11, the sets that include no content are marked in gray. A beneficial effect of Manner 2 is that a quantity of overall information bits of the control information #2 is unchanged, so that a quantity of times of blind detection by the terminal device is reduced, and power of the terminal device is saved.

It may be understood that even if the quantity Y of control information fields is the same as the maximum quantity of terminal devices currently supported by the network device as described in Manner 2, the index field may be explicitly or implicitly indicated according to the method described in Manner 1.

In Manner 1 or Manner 2, sizes of different control information fields may be the same or may be different. If sizes of control information fields are different, there may be an express identifier at a start location or an end location of each control information field, so that the terminal device can correctly distinguish between the control information fields after receiving the control information #2. Regardless of whether Manner 1 or Manner 2 is used, the terminal device #1 can determine, based on the index #1 or the index #1 and the group index #1, whether the control information #2 includes control information indicated to the terminal device #1. For example, if the network device sends the control information #2 in Manner 1, the terminal device #1 may determine, based on an explicitly or implicitly indicated index #1 (or an index #1 and a group index #1 that are explicitly or implicitly indicated), whether the control information #2 includes the control information field sent to the terminal device #1. If the network device sends the control information #2 in Manner 2, the terminal device #1 may locate, based on an explicitly or implicitly indicated index #1 (or an index #1 and a group index #1 that are explicitly or implicitly indicated), a control information field consistent with the index #1 (or the index #1 and the group index #1) of the terminal device #1, and determine, depending on whether the field includes content (a specific method is described above), whether the control information #2 includes the control information field sent to the terminal device #1.

It may be understood that if a terminal device has not received or detected the second physical layer control information within the entire first time period, it may be understood that the network device instructs the terminal device not to receive or send data.

Optionally, this embodiment of this application may further include step S304.

Step S304: The first terminal device receives or sends data according to the first control information field by using a resource indicated by the resource indication information.

Specifically, the first physical layer control information includes the resource indication information, the first control information field is used to instruct the first terminal device to receive or send data by using the resource indicated by the resource indication information, and the resource includes a frequency domain resource, a time domain resource, or a time-frequency resource. In other words, the time domain resource and/or the frequency domain resource are or is placed in the dedicated first physical layer control information that is sent only once within the first time period, so that the resource indication information is prevented from being repeatedly sent in the second physical layer control information that may be subsequently sent a plurality of times, thereby reducing control information overheads.

In a possible implementation, the first physical layer control information further includes a first parameter set. The first parameter set includes at least one of a modulation and coding scheme MCS index, a hybrid automatic repeat request HARQ process index, a new data indicator NDI, a redundancy version RV index, a HARQ acknowledgement feedback HARQ-ACK feedback time-frequency resource indicator, a downlink assignment index DAI, the first index, and the first time period. The first control information field is used to instruct the first terminal device to receive or send data based on the first parameter set. The first terminal device receives or sends data according to the first control information field and the first parameter set.

In a possible implementation, the first physical layer control information further includes second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period. The second physical layer control information further includes a third parameter set. The third parameter set includes at least one of a HARQ process index, a new data indicator NDI, a redundancy version RV index, the HARQ acknowledgement feedback HARQ-ACK feedback time-frequency resource indicator, and the downlink assignment index DAI. The first control information field is used to instruct the first terminal device to receive or send data based on the second parameter set and the third parameter set. The first terminal device receives or sends data according to the first control information field, the second parameter set, and the third parameter set.

Then, content specifically carried in the first physical layer control information and content specifically carried in the second physical layer control information are elaborated by using examples.

Example 1

The first physical layer control information carries at least one of the following information:
time-frequency resource indication information
an MCS (index)
a HARQ process (index)
an NDI
an RV (index)
a HARQ-ACK feedback time-frequency resource indicator
a DAI
an index (including the first index or the first index and the first group index) allocated to the terminal device
a time range The time-frequency resource indication information may be a segment of frequency domain resource within the first time period. After receiving the second physical layer control information, the terminal device receives or sends a signal on the corresponding frequency domain resource in a time domain unit on which the second physical layer control information is located. Alternatively, the time-frequency resource indication information may be a segment of time-frequency resource in a time domain unit on which the second physical layer control information is located within the first time period. For example, the time-frequency resource indication information is a segment of frequency domain resource in a mini-slot in the time domain unit on which the second physical layer control information is located. In this case, after receiving the second physical layer control information, the terminal device receives or sends a signal on the corresponding time-frequency resource in the time domain unit on which the second physical layer control information is located. The first physical layer control information is further used to indicate whether current scheduling is used to schedule the terminal device to receive downlink data or send uplink data. It should be noted that when the first physical layer control information indicates a time domain resource, the terminal device can monitor the second physical layer control information on a corresponding time domain unit or a nearby time domain unit without monitoring the second physical layer control information within the entire first time period.

If the second physical layer control information indicates only whether scheduling is performed, a first index of a scheduled (indicated) terminal device or arranged bits of a first index may be sent by using the second physical layer control information. Optionally, a bit 0 indicates that no scheduling is performed this time, and a bit 1 indicates that scheduling is implemented this time. For example, a quantity of terminal devices currently scheduled by the network device is 8, the second physical layer control information includes 8 bits (excluding a CRC check bit), each of the bits corresponds to one terminal device from left to right (or from right to left), a corresponding bit 0 indicates that no scheduling is performed this time, and a corresponding bit 1 indicates that scheduling is performed this time. "This time" may represent the time domain unit on which the control information #2 is located, or a time domain unit or a time domain unit set on which the index #1 is valid and that is indicated by the control information #2 and specified in a communication standard. This implementation method is an example of Manner 2. In other words, indexes #1 are indicated by bits in order, and each control information field includes only 1-bit indication information.

In addition, the second physical layer control information may further indicate a downlink assignment index (DAI) bit for each time of scheduling. For example, for the first terminal device (or a terminal device scheduled by using second physical layer control information), a HARQ acknowledgement information (HARQ-ACK) bit is independently fed back for data scheduled by using each piece of second physical layer control information, or a HARQ-ACK bit is fed back for data scheduled by using every several pieces of second physical layer control information (at least one HARQ-ACK bit is fed back each time). In this case, within a range of a first time period scheduled by using first physical layer control information (or a range of a first time period within which an index #1 or an index #1 and a group index #1 indicated by first physical layer control information are valid), transmission scheduled by using all pieces of second physical layer control information may belong to a same HARQ process. A transport block (transport block), a code block, or a code block group may be scheduled by using each piece of second physical layer control information.

Example 2

The first physical layer control information carries at least one of the following information:
time-frequency resource indication information
an MCS index
a HARQ-ACK feedback time-frequency resource indicator
a DAI
an index (including the first index or the first index and the first group index) allocated to the terminal device
a time range The second physical layer control information carries at least one of the following information:
a HARQ process index
an NDI
an RV index
a HARQ-ACK feedback time-frequency resource indicator
a DAI In the case of Example 2, within a first time period for scheduling by using first physical layer control information, transmission scheduled by all pieces of second physical layer control information may belong to different hybrid automatic repeat request (Hybrid Automatic Repeat Req, HARQ) processes. Only the first physical layer control information may include a HARQ-ACK feedback time-frequency resource indicator and DAI information; or the first physical layer control information may include a HARQ-ACK feedback time-frequency resource indicator, and the second physical layer control information includes DAI information. In this case, one HARQ-ACK ACK message is used for feedback on all data that are received or sent within the first time period and are scheduled by using first physical layer control information. Alternatively, only the second physical layer control information may include a HARQ-ACK feedback time-frequency resource indicator and DAI information. In this case, received data or sent data scheduled by using all pieces of second physical layer control information correspond to different HARQ-ACK bits (which may be included in one HARQ-ACK message, or may be included in different HARQ-ACK messages, depending on a configuration and an indication of the network device). If the network device schedules the terminal device to send data, the terminal device feeds back a HARQ-ACK bit corresponding to the data to the network device. If the network device schedules the terminal device to receive data, the network device feeds back a HARQ-ACK bit corresponding to the data to the terminal device.

In addition, in Example 2, the network device may indicate, by reusing one or more of a modulation and coding scheme (Modulation and Coding Scheme, MCS) index field, a new data indicator (NDI) field, a HARQ process field, and a redundancy version (RV) field in the first physical layer control information, the first index allocated to the terminal device. Alternatively, the network device may indicate, by reusing one or more of an MCS index field, an NDI field, a HARQ process field, and an RV field in the first physical layer control information, the first index and the first group index that are allocated to the terminal device. Alternatively, the network device may indicate, by reusing one or more of an MCS index field, an NDI field, a HARQ process field, and an RV field in the first physical layer control information, the range of the first time period within which the first physical layer control information is valid (or the first time period within which the first index is valid, or the first time period within which the terminal device monitors the second physical layer control information).

In conclusion, based on one of the application scenarios (the eMBB service and the URLLC service efficiently coexist) mentioned in this application, it may be understood that the first physical layer control information is mainly used to notify the first terminal device of a time-frequency resource, a transmission policy, and the like that need to be used if the first terminal device needs to transmit a service within a subsequent period of time. In other words, when learning that the first terminal device needs to transmit a resource, the network device sends the first physical layer control information to the first terminal device, to notify the terminal device of a resource and a manner used to transmit data within a subsequent time range. However, because the URLLC service is random, it is uncertain whether transmission can certainly be performed according to an "original plan" within a subsequent time range. Therefore, at a subsequent location closer to a corresponding time domain resource, the first terminal device further needs to be notified whether data is to be transmitted finally according to the "original plan", so that a randomness transmission requirement of the URLLC service is met.

Certainly, if no URLLC service randomly arrives, in other words, only the eMBB service is transmitted on a relatively small time domain unit, the following problem can also be avoided: Because an original time domain unit is divided into n parts, all control information content in control information needs to be repeatedly sent n times, and there is a waste of resources occupied by the control information. In addition, from a perspective of the terminal device, only according to an existing technical idea, the terminal device may need to monitor, on n time domain units, whether there is control information of the terminal device. However, according to the solution in this application, monitoring needs to be performed only within the corresponding first time period after the first physical layer control information is received, thereby reducing overheads of the terminal device.

The method in the embodiments of this application is described above in detail, and the following provides apparatuses in the embodiments of this application.

Figure 12:
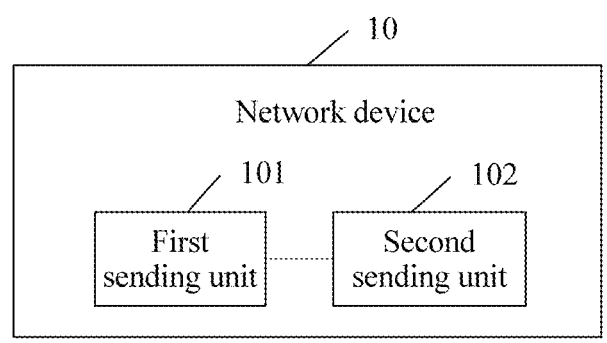
FIG. 12 is a schematic structural diagram of a network device according to an embodiment of this application.

FIG. 12 is a schematic structural diagram of a network device according to an embodiment of this application. The network device may include a first sending unit 101 and a second sending unit 102. Detailed descriptions of the units are as follows:

The first sending unit 101 is configured to send first physical layer control information to a first terminal device, where the first physical layer control information is used to indicate a first index to the first terminal device, and is used to instruct the first terminal device to monitor second physical layer control information within a first time period, and the first index is used by the first terminal device to determine a control information field that is in the second physical layer control information and that corresponds to the first terminal device.

The second sending unit 102 is configured to send the second physical layer control information to at least one terminal device within the first time period, where the at least one terminal device includes the first terminal device, the second physical layer control information includes at least one control information field, the at least one control information field includes a first control information field, and the first control information field is used to instruct the first terminal device to receive or send data, or the first control information field is used to instruct the first terminal device to receive or send data or not to receive or send data.

Optionally, the second sending unit 102 is specifically configured to: send the second physical layer control information in common search space within the first time period, where the common search space is search space that is common to the at least one terminal device or common to a serving cell.

Optionally, the at least one terminal device belongs to a first terminal device group; and the first physical layer control information is further used to indicate a first group index, and the first group index is used to identify the first terminal device group.

Optionally, the second physical layer control information is scrambled by using a first scrambling code sequence, and the first scrambling code sequence is calculated by using at least the first group index or a cell ID.

Optionally, the first physical layer control information includes resource indication information, the first control information field is used to instruct the first terminal device to receive or send data by using a resource indicated by the resource indication information, and the resource includes a frequency domain resource, a time domain resource, or a time-frequency resource.

Optionally, the first physical layer control information includes a first field, and the first field includes at least one of a modulation and coding scheme indication field, a new data indicator field, a redundancy version indication field, a transmit power control TPC indication field, and a HARQ process number indication field; and that the first physical layer control information is used to indicate a first index to the first terminal device includes: the first physical layer control information is used to indicate the first index by reusing the first field.

Optionally, the network device 10 further includes: a first configuration unit, configured to configure a maximum value of the first index by using higher layer signaling; or a second configuration unit, configured to configure, by using higher layer signaling, a quantity of bits or a quantity of significant bits included in a field corresponding to the first index.

Optionally, the network device 10 further includes: a definition unit, configured to predefine the first time period; or a third configuration unit, configured to configure the first time period by using higher layer signaling; or an indication unit, configured to indicate the first time period by using the first physical layer control information.

Optionally, the at least one terminal device includes X terminal devices, and the at least one control information field includes Y control information fields, where both X and Y are positive integers.

If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data; or if Y is less than X, the first control information field is used to instruct the first terminal device to receive or send data; or if Y is greater than X, the first control information field is used to instruct the first terminal device to receive or send data or not to receive or send data.

Optionally, the X terminal devices further include a second terminal device, and the network device 10 further includes: a third sending unit, configured to send third physical layer control information to the second terminal device, where the third physical layer control information is used to indicate a second index to the second terminal device, and is used to instruct the second terminal device to monitor fourth physical layer control information within a second time period, the second index is used by the second terminal device to determine a control information field that is in the fourth physical layer control information and that corresponds to the second terminal device, the fourth physical layer control information is the second physical layer control information within a third time period which is an overlapped part of the first time period and the second time period, and within the third time period, if Y is less than X, and the Y control information fields do not include the control information field corresponding to the second terminal device, the second physical layer control information is used to instruct the second terminal device not to receive or send data.

Optionally, the network device 10 further includes: a predefinition unit, configured to predefine a value of Y, where the first control information field is used to instruct the first terminal device to receive or send data or not to receive or send data; or a fourth sending unit, configured to send higher layer signaling to the first terminal device, where the higher layer signaling is used to indicate a value of Y.

Optionally, the first physical layer control information further includes a first parameter set. The first parameter set includes at least one of a modulation and coding scheme MCS index, a hybrid automatic repeat request process HARQ process index, a new data indicator NDI, a redundancy version RV index, a HARQ acknowledgement feedback HARQ-ACK feedback time-frequency resource indicator, a downlink assignment index DAI, the first index, and the first time period.

The first control information field is used to instruct the first terminal device to receive or send data based on the first parameter set.

Optionally, the first physical layer control information further includes second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period.

The second physical layer control information further includes a third parameter set. The third parameter set includes at least one of a HARQ process index (HARQ process index), a new data indicator NDI, a redundancy version RV index, the HARQ acknowledgement feedback HARQ-ACK feedback time-frequency resource indicator, and the downlink assignment index DAI.

The first control information field is used to instruct the first terminal device to receive or send data based on the second parameter set and the third parameter set.

It should be noted that for functions of the functional units in the network device 10 described in this embodiment of this application, reference may be made to the related descriptions of the foregoing method embodiment in FIG. 2 to FIG. 11, and details are not described herein again.

Figure 13:
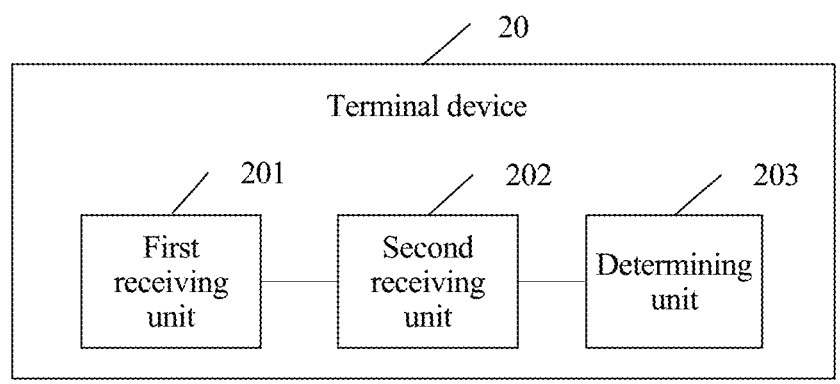
FIG. 13 is a schematic structural diagram of a terminal device according to an embodiment of this application.

FIG. 13 is a schematic structural diagram of a terminal device according to an embodiment of this application. The terminal device is a first terminal device, and the first terminal device may include a first receiving unit 201, a second receiving unit 202, and a determining unit 203. Detailed descriptions of the units are as follows:

The first receiving unit 201 is configured to receive first physical layer control information sent by a network device, where the first physical layer control information indicates a first index, and is used to instruct the first terminal device to monitor second physical layer control information within a first time period, and the first index corresponds to the first terminal device within the first time period.

The second receiving unit 202 is configured to receive, within the first time period, the second physical layer control information sent by the network device, where the second physical layer control information includes at least one control information field, the at least one control information field includes a first control information field, and the first control information field is used to instruct the first terminal device to receive or send data, or the first control information field is used to instruct the first terminal device to receive or send data or not to receive or send data.

The determining unit 203 is configured to determine, based on the first index, the first control information field that is in the second physical layer control information and that corresponds to the first terminal device.

Optionally, the second receiving unit 202 is specifically configured to: receive, within the first time period, the second physical layer control information sent by the network device in common search space, where the common search space is search space that is common to a terminal device group to which the first terminal device belongs or that is common to a serving cell, and the terminal device group includes at least the first terminal device.

Optionally, the first physical layer control information includes resource indication information, and the terminal device 20 further includes: a first transmission unit, configured to receive or send data according to the first control information field by using a resource indicated by the resource indication information, where the resource includes a frequency domain resource, a time domain resource, or a time-frequency resource.

Optionally, the first physical layer control information further indicates a first group index, and the terminal device 20 further includes: a second determining unit, configured to determine, based on the first group index, a first terminal device group to which the first terminal device belongs.

Optionally, the second physical layer control information is scrambled by using a first scrambling code sequence, and the first scrambling code sequence is calculated by using at least the first group index or a cell ID.

Optionally, the first terminal device group includes X terminal devices, and the at least one control information field includes Y control information fields, where both X and Y are positive integers.

If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data; or if Y is less than X, the first control information field is used to instruct the first terminal device to receive or send data; or if Y is greater than X, the first control information field is used to instruct the first terminal device to receive or send data or not to receive or send data.

Optionally, the first physical layer control information further includes a first parameter set. The first parameter set includes at least one of a modulation and coding scheme MCS index, a hybrid automatic repeat request process HARQ process index, a new data indicator NDI, a redundancy version RV index, a HARQ acknowledgement feedback HARQ-ACK feedback time-frequency resource indicator, a downlink assignment index DAI, the first index, and the first time period. The terminal device 20 further includes: a second transmission unit, configured to receive or send data according to the first control information field and the first parameter set.

Optionally, the first physical layer control information further includes a second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period.

The second physical layer control information further includes a third parameter set. The third parameter set includes at least one of a HARQ process index, a new data indicator NDI, a redundancy version RV index, the HARQ acknowledgement feedback HARQ-ACK feedback time-frequency resource indicator, and the downlink assignment index DAI.

The terminal device 20 further includes: a third transmission unit, configured to receive or send data according to the first control information field, the second parameter set, and the third parameter set.

Optionally, the terminal device 20 further includes: a monitoring unit, configured to: monitor the first physical layer control information at intervals of M time domain units, and monitor the second physical layer control information at intervals of N time domain units, where both M and N are positive integers greater than or equal to 1, and M is greater than N.

It should be noted that for functions of the functional units in the terminal device 20 described in this embodiment of this application, reference may be made to the related descriptions of the foregoing method embodiment in FIG. 2 to FIG. 11, and details are not described herein again.

Figure 14:
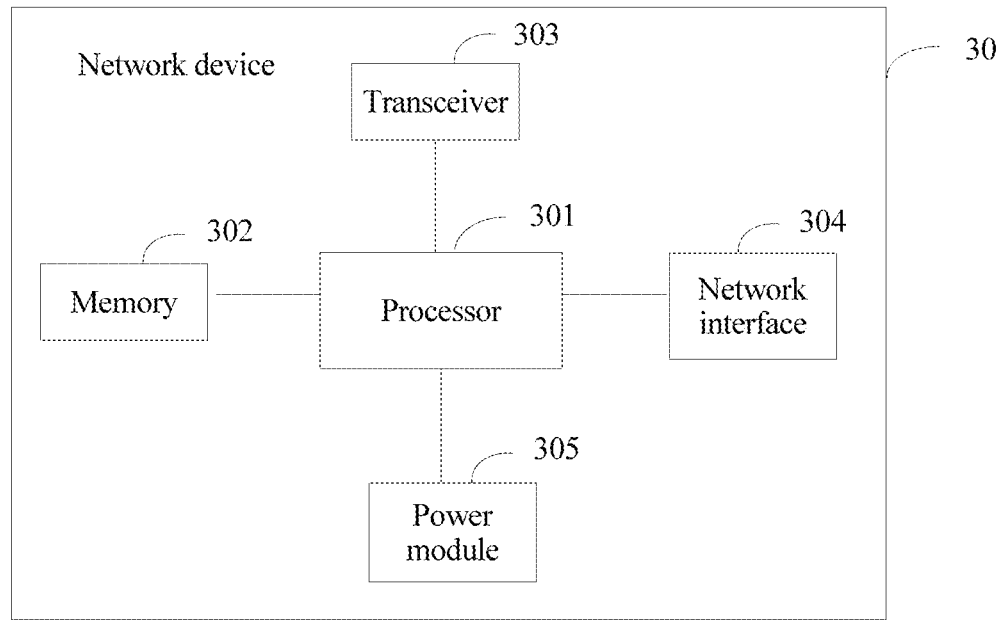
FIG. 14 is a schematic structural diagram of another network device according to an embodiment of this application.

FIG. 14 is a schematic structural diagram of another network device according to an embodiment of this application. As shown in FIG. 14, the network device 30 includes a processor 301, a memory 302, and a transceiver 303. The processor 301, the memory 302, and the transceiver 303 may be connected by using a bus or in another manner.

Optionally, the network device 30 may further include a network interface 304 and a power module 305.

The processor 301 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor 301 may implement or execute various example logical blocks, modules, and circuits described with reference to content disclosed in this application. Alternatively, the processor may be a combination implementing a computing function, for example, a combination of one or more microprocessors, or a combination of a DSP and a microprocessor.

The memory 302 is configured to store an instruction. In specific implementation, the memory 302 may be a read-only memory (ROM for short) or a random access memory (RAM for short). In this embodiment of this application, the memory 302 is configured to store session connection establishment program code.

The transceiver 303 is configured to receive and send a signal, and is configured to communicate with another network device, for example, receive data from or send data to another base station or terminal device.

The network interface 304 is used by the network device 30 to perform data communication with another device. The network interface 304 may be a wired interface or a wireless interface, and is configured to make a communication connection between the network device and another network device such as a terminal device, a base station, a server, or a security gateway over a wired or wireless network.

The power module 305 is configured to supply power to each module in the network device 30.

The processor 301 is configured to invoke the instruction stored in the memory 302 to perform the following operations.

The processor 301 is configured to send first physical layer control information to a first terminal device by using the transceiver 303, where the first physical layer control information is used to indicate a first index to the first terminal device, and is used to instruct the first terminal device to monitor second physical layer control information within a first time period, and the first index is used by the first terminal device to determine a control information field that is in the second physical layer control information and that corresponds to the first terminal device; and the processor 301 is configured to send the second physical layer control information to at least one terminal device within the first time period by using the transceiver 303, where the at least one terminal device includes the first terminal device, the second physical layer control information includes at least one control information field, the at least one control information field includes a first control information field, and the first control information field is used to instruct the first terminal device to receive or send data, or the first control information field is used to instruct the first terminal device to receive or send data or not to receive or send data.

Optionally, that the processor 301 is configured to send the second physical layer control information to at least one terminal device within the first time period by using the transceiver 303 is specifically: sending the second physical layer control information in common search space within the first time period by using the transceiver 303, where the common search space is search space that is common to the at least one terminal device or common to a serving cell.

Optionally, the at least one terminal device belongs to a first terminal device group; and the first physical layer control information is further used to indicate a first group index, and the first group index is used to identify the first terminal device group.

Optionally, the second physical layer control information is scrambled by using a first scrambling code sequence, and the first scrambling code sequence is calculated by using at least the first group index or a cell ID.

Optionally, the first physical layer control information includes resource indication information, the first control information field is used to instruct the first terminal device to receive or send data by using a resource indicated by the resource indication information, and the resource includes a frequency domain resource, a time domain resource, or a time-frequency resource.

Optionally, the first physical layer control information includes a first field, and the first field includes at least one of a modulation and coding scheme indication field, a new data indicator field, a redundancy version indication field, a transmit power control TPC indication field, and a HARQ process number indication field; and that the first physical layer control information is used to indicate a first index to the first terminal device includes: the first physical layer control information is used to indicate the first index by reusing the first field.

Optionally, the processor 301 is further configured to: configure a maximum value of the first index by using higher layer signaling; or configure, by using higher layer signaling, a quantity of bits or a quantity of significant bits included in a field corresponding to the first index.

Optionally, the processor 301 is further configured to: predefine the first time period; or configure the first time period by using higher layer signaling; or indicate the first time period by using the first physical layer control information.

Optionally, the at least one terminal device includes X terminal devices, and the at least one control information field includes Y control information fields, where both X and Y are positive integers.

If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data; or if Y is less than X, the first control information field is used to instruct the first terminal device to receive or send data; or if Y is greater than X, the first control information field is used to instruct the first terminal device to receive or send data or not to receive or send data.

Optionally, the X terminal devices further include a second terminal device, and the processor 301 is further configured to: send third physical layer control information to the second terminal device by using the transceiver 303, where the third physical layer control information is used to indicate a second index to the second terminal device, and is used to instruct the second terminal device to monitor fourth physical layer control information within a second time period, the second index is used by the second terminal device to determine a control information field that is in the fourth physical layer control information and that corresponds to the second terminal device, the fourth physical layer control information is the second physical layer control information within a third time period which is an overlapped part of the first time period and the second time period, and within the third time period, if Y is less than X, and the Y control information fields do not include the control information field corresponding to the second terminal device, the second physical layer control information is used to instruct the second terminal device not to receive or send data.

Optionally, the processor 301 is further configured to: predefine a value of Y, where the first control information field is used to instruct the first terminal device to receive or send data or not to receive or send data; or send higher layer signaling to the first terminal device by using the transceiver 303, where the higher layer signaling is used to indicate a value of Y.

Optionally, the first physical layer control information further includes a first parameter set. The first parameter set includes at least one of a modulation and coding scheme MCS index, a hybrid automatic repeat request process HARQ process index, a new data indicator NDI, a redundancy version RV index, a HARQ acknowledgement feedback HARQ-ACK feedback time-frequency resource indicator, a downlink assignment index DAI, the first index, and the first time period. The first control information field is used to instruct the first terminal device to receive or send data based on the first parameter set.

Optionally, the first physical layer control information further includes second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period. The second physical layer control information further includes a third parameter set. The third parameter set includes at least one of a HARQ process index, a new data indicator NDI, a redundancy version RV index, the HARQ acknowledgement feedback HARQ-ACK feedback time-frequency resource indicator, and the downlink assignment index DAI. The first control information field is used to instruct the first terminal device to receive or send data based on the second parameter set and the third parameter set.

It should be noted that for functions of the functional units in the network device 30 described in this embodiment of this application, reference may be made to the related descriptions of the foregoing method embodiment in FIG. 2 to FIG. 11, and details are not described herein again.

Figure 15:
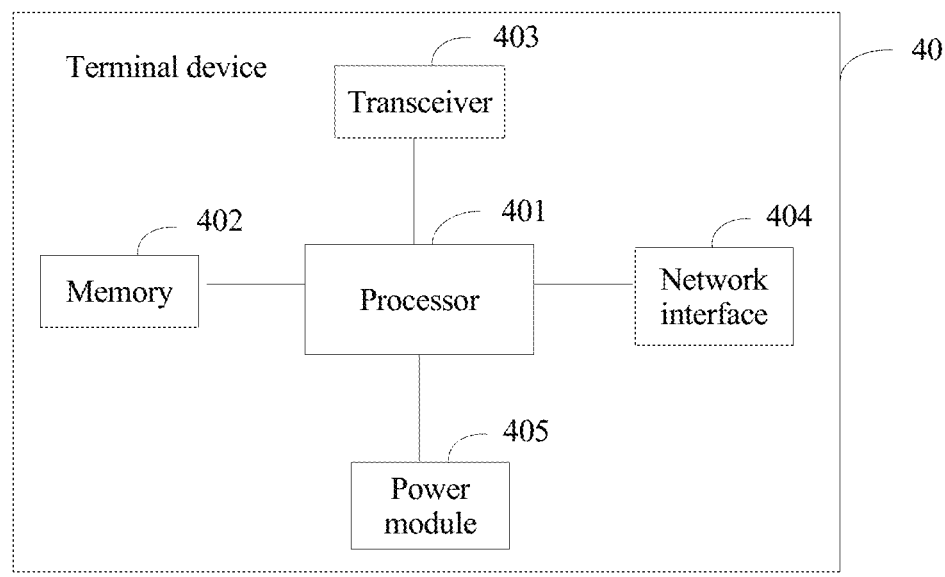
FIG. 15 is a schematic structural diagram of a terminal device according to an embodiment of this application.

FIG. 15 is a schematic structural diagram of another terminal device according to an embodiment of this application. The terminal device may be a first terminal device. As shown in FIG. 15, the terminal device includes a processor 401, a memory 402, and a transceiver 403. The processor 401, the memory 402, and the transceiver 403 may be connected by using a bus or in another manner.

Optionally, the terminal device may further include a network interface 404 and a power module 405.

The processor 401 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor 401 may implement or execute various example logical blocks, modules, and circuits described with reference to content disclosed in this application. Alternatively, the processor may be a combination implementing a computing function, for example, a combination of one or more microprocessors, or a combination of a DSP and a microprocessor.

The memory 402 is configured to store an instruction. In specific implementation, the memory 402 may be a read-only memory (OM for short) or a random access memory (RAM for short). In this embodiment of this application, the memory 402 is configured to store session connection establishment program code.

The transceiver 403 is configured to receive and send a signal, and is configured to communicate with another network device, for example, receive data from or send data to another base station or security gateway.

The network interface 404 is used by the terminal device to perform data communication with another device. The network interface 404 may be a wired interface or a wireless interface, and is configured to make a communication connection between the network device and another network device such as a terminal device, a base station, a server, or a security gateway over a wired or wireless network.

The power module 405 is configured to supply power to each module in the terminal device.

The processor 401 is configured to invoke the instruction stored in the memory 402 to perform the following operations.

The processor 401 is configured to receive, by using the transceiver 403, first physical layer control information sent by a network device, where the first physical layer control information indicates a first index, and is used to instruct the first terminal device to monitor second physical layer control information within a first time period, and the first index corresponds to the first terminal device within the first time period; the processor 401 is further configured to receive, within the first time period by using the transceiver 403, the second physical layer control information sent by the network device, where the second physical layer control information includes at least one control information field, the at least one control information field includes a first control information field, and the first control information field is used to instruct the first terminal device to receive or send data, or the first control information field is used to instruct the first terminal device to receive or send data or not to receive or send data; and the processor 401 is configured to determine, based on the first index, the first control information field that is in the second physical layer control information and that corresponds to the first terminal device.

Optionally, that the processor 401 is further configured to receive, within the first time period by using the transceiver 403, the second physical layer control information sent by the network device is specifically: receiving, within the first time period by using the transceiver 403, the second physical layer control information sent by the network device in common search space, where the common search space is search space that is common to a terminal device group to which the first terminal device belongs or that is common to a serving cell, and the terminal device group includes at least the first terminal device.

Optionally, the first physical layer control information includes resource indication information, and the processor 401 is further configured to: receive or send data according to the first control information field by using a resource indicated by the resource indication information and by using the transceiver 403, where the resource includes a frequency domain resource, a time domain resource, or a time-frequency resource.

Optionally, the first physical layer control information further indicates a first group index, and the processor 401 is further configured to: determine, based on the first group index, a first terminal device group to which the first terminal device belongs.

Optionally, the second physical layer control information is scrambled by using a first scrambling code sequence, and the first scrambling code sequence is calculated by using at least the first group index or a cell ID.

Optionally, the first terminal device group includes X terminal devices, and the at least one control information field includes Y control information fields, where both X and Y are positive integers.

If Y is equal to X, the Y control information fields are in a one-to-one correspondence with the X terminal devices, and the first control information field is used to instruct the first terminal device to receive or send data, or the first control information field is used to instruct the first terminal device to receive or send data or not to receive or send data; or if Y is less than X, the first control information field is used to instruct the first terminal device to receive or send data; or if Y is greater than X, the first control information field is used to instruct the first terminal device to receive or send data or not to receive or send data.

Optionally, the first physical layer control information further includes a first parameter set. The first parameter set includes at least one of a modulation and coding scheme MCS index, a hybrid automatic repeat request process HARQ process index, a new data indicator NDI, a redundancy version RV index, a HARQ acknowledgement feedback HARQ-ACK feedback time-frequency resource indicator, a downlink assignment index DAI, the first index, and the first time period. The processor 401 is further configured to: receive or send data according to the first control information field and the first parameter set by using the transceiver 403.

Optionally, the first physical layer control information further includes a second parameter set. The second parameter set includes at least one of a modulation and coding scheme MCS index, a HARQ acknowledgement feedback HARQ-ACK feedback time-frequency resource indicator, a downlink assignment index DAI, the first index, and the first time period.

The second physical layer control information further includes a third parameter set. The third parameter set includes at least one of a HARQ process index (HARQ process index), a new data indicator NDI, a redundancy version RV index, the HARQ acknowledgement feedback HARQ-ACK feedback time-frequency resource indicator, and the downlink assignment index DAI.

The processor 401 is further configured to: receive or send data according to the first control information field, the second parameter set, and the third parameter set by using the transceiver 403.

Optionally, the processor 401 is further configured to: monitor the first physical layer control information at intervals of M time domain units, and monitor the second physical layer control information at intervals of N time domain units, where both M and N are positive integers greater than or equal to 1, and M is greater than N.

It should be noted that for functions of the functional units in the terminal device 40 described in this embodiment of this application, reference may be made to the related descriptions of the foregoing method embodiment in FIG. 2 to FIG. 11, and details are not described herein again.

An embodiment of this application further provides a computer storage medium. The computer storage medium may store a program, and when the program is executed, some or all steps of any control information sending and receiving method recorded in the foregoing method embodiments are performed.

An embodiment of this application further provides a computer program. The computer program includes an instruction, and when the computer program is executed by a computer, the computer can perform some or all steps of any control information sending and receiving method.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like, and may be specifically a processor in the computer device) to perform all or some of the steps of the methods described in the embodiments of this application. The storage medium includes any medium that can store program code, such as a USB flash drive, a removable hard disk, a magnetic disk, an optical disc, a read-only memory (ROM for short), or a random access memory (RAM for short).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
sending first physical layer control information to a first terminal device, wherein the first physical layer control information indicates a first index to the first terminal device, the first index is determinable by the first terminal device using an identifier of the first terminal device in a cell, the identifier of the first terminal device in the cell is longer than the first index, and the first physical layer control information instructs the first terminal device to monitor second physical layer control information within a first time period, and wherein the first physical layer control information comprises resource indication information indicating a resource comprising a frequency domain resource, a time domain resource, or a time-frequency resource, and wherein the first physical layer control information initially schedules the resource for the first terminal device; and
sending the second physical layer control information to a group of terminal devices within the first time period, wherein the group of terminal devices comprises the first terminal device, the second physical layer control information comprises a first control information field, wherein the first index is used by the first terminal device to determine the first control information field that is comprised in the second physical layer control information and that corresponds to the first terminal device, wherein the second physical layer control information confirms the scheduling of the resource for the first terminal device, and wherein:
the first control information field instructs the first terminal device to receive or send data using the resource; or
the first control information field instructs the first terminal device not to receive or send data using the resource.

2. The method according to claim 1, wherein sending the second physical layer control information to the group of terminal devices within the first time period comprises:
sending the second physical layer control information in a common search space within the first time period, wherein the common search space is common to the group of terminal devices, or common to a serving cell.

3. The method according to claim 1, wherein:
terminal devices of the group of terminal devices belong to a first terminal device group; and
the first physical layer control information further indicates a first group index, and the first group index identifies the first terminal device group.

4. The method according to claim 3, wherein the second physical layer control information is scrambled using a first scrambling code sequence, and the first scrambling code sequence is calculated using the first group index or a cell identity.

5. The method according to claim 1, wherein:
the first physical layer control information further comprises a first field, and the first field comprises a modulation and coding scheme indication field, a new data indicator field, a redundancy version indication field, a transmit power control (TPC) indication field, or a hybrid automatic repeat request (HARQ) process number indication field
the first physical layer control information indicating the first index to the first terminal device comprises:
the first physical layer control information indicating the first index using the first field.

6. The method according to claim 1, wherein the first physical layer control information further comprises the first time period.

7. The method according to claim 1, wherein the first time period is preset in a communication standard.

8. The method according to claim 1, wherein the first physical layer control information is sent to only the first terminal device.

9. A method, comprising:
receiving first physical layer control information from a network device, wherein the first physical layer control information indicates a first index, the first physical layer control information instructs a first terminal device to monitor second physical layer control information within a first time period, the first index corresponds to the first terminal device within the first time period, wherein the first physical layer control information comprises resource indication information indicating a resource comprising a frequency domain resource, a time domain resource, or a time-frequency resource, and wherein the first physical layer control information initially schedules the resource for the first terminal device;
determining the first index from the first physical layer control information using an identifier of the first terminal device in a cell, wherein the identifier of the first terminal device in the cell is longer than the first index;
receiving, within the first time period, the second physical layer control information from the network device, wherein the second physical layer control information comprises a first control information field, the second physical layer control information confirms the scheduling of the resource for the first terminal device, and the first control information field instructs the first terminal device to receive or send data using the resource, or the first control information field instructs the first terminal device not to receive or send data using the resource; and determining, based on the first index, the first control information field that is comprised in the second physical layer control information and that corresponds to the first terminal device.

10. The method according to claim 9, wherein receiving, within the first time period, the second physical layer control information sent by the network device comprises:

receiving, within the first time period, the second physical layer control information sent by the network device in a common search space, wherein the common search space is search space that is common to a terminal device group to which the first terminal device belongs or that is common to a serving cell.

11. The method according to claim 9, wherein the first physical layer control information further indicates a first group index, and the method further comprises:

determining, based on the first group index, a first terminal device group to which the first terminal device belongs.

12. The method according to claim 11, wherein the second physical layer control information is scrambled using a first scrambling code sequence, and the first scrambling code sequence is calculated using the first group index or a cell ID.

13. The method according to claim 9, further comprising:

monitoring the first physical layer control information at intervals of M time domain units, and monitoring the second physical layer control information at intervals of N time domain units, wherein both M and N are positive integers greater than or equal to 1, and M is greater than N.

14. An apparatus, comprising:

a transceiver;

a non-transitory storage medium including executable instructions; and a processor coupled to the non-transitory storage medium, the processor being configured to execute the instructions, wherein the instructions include instructions for:

sending first physical layer control information to a first terminal device using the transceiver, wherein the first physical layer control information indicates a first index to the first terminal device, the first index is determinable by the first terminal device using an identifier of the first terminal device in a cell, the identifier of the first terminal device in the cell is longer than the first index, and the first physical layer control information instructs the first terminal device to monitor second physical layer control information within a first time period, and wherein the first physical layer control information comprises resource indication information indicating a resource comprising a frequency domain resource, a time domain resource, or a time-frequency resource, and wherein the first physical layer control information initially schedules the resource for the first terminal device; and sending the second physical layer control information to a group of terminal devices within the first time period using the transceiver, wherein the group of terminal devices comprises the first terminal device, the second physical layer control information comprises a first control information field, wherein the first index is used by the first terminal device to determine the first control information field that is comprised in the second physical layer control information and that corresponds to the first terminal device, wherein the second physical layer control information confirms the scheduling of the resource for the first terminal device, and wherein:

the first control information field instructs the first terminal device to receive or send data using the resource; or the first control information field instructs the first terminal device not to receive or send data using the resource.

15. The apparatus according to claim 14, wherein the instructions for sending the second physical layer control information to the group of terminal devices within the first time period using the transceiver comprise instructions for:

sending the second physical layer control information in a common search space within the first time period using the transceiver, wherein the common search space is search space that is common to the group of terminal devices or common to a serving cell.

16. The apparatus claim 14, wherein:

terminal devices of the group of terminal devices belong to a first terminal device group; and the first physical layer control information further indicates a first group index, and the first group index identifies the first terminal device group.

17. The apparatus according to claim 16, wherein the second physical layer control information is scrambled using a first scrambling code sequence, and the first scrambling code sequence is calculated using the first group index or a cell ID.

18. An apparatus, comprising:

a transceiver;

a non-transitory storage medium including executable instructions; and a processor coupled to the non-transitory storage medium, the processor being configured to execute the instructions, wherein the instructions include instructions for:

receiving, using the transceiver, first physical layer control information from a network device, wherein the first physical layer control information indicates a first index, the first physical layer control information instructs a first terminal device to monitor second physical layer control information within a first time period, the first index corresponds to the first terminal device within the first time period, wherein the first physical layer control information comprises resource indication information indicating a resource comprising a frequency domain resource, a time domain resource, or a time-frequency resource, and wherein the first physical layer control information initially schedules the resource for the first terminal device;

determining the first index from the first physical layer control information using an identifier of the first terminal device in a cell, wherein the identifier of the first terminal device in the cell is longer than the first index;

receiving, within the first time period using the transceiver, the second physical layer control information from the network device, wherein the second physical layer control information confirms the scheduling of the resource for the first terminal device, the second physical layer control information comprises a first control information field, and the first control information field instructs the first terminal device to receive or send data using the resource, or the first control information field instructs the first terminal device not to receive or send data using the resource; and determining, based on the first index, the first control information field that is comprised in the second physical layer control information and that corresponds to the first terminal device.

19. The apparatus according to claim 18, wherein the instructions for receiving, within the first time period using the transceiver, the second physical layer control information, comprises:

receiving, within the first time period using the transceiver, the second physical layer control information sent by the network device in a common search space, wherein the common search space is search space that is common to a terminal device group to which the first terminal device belongs or that is common to a serving cell.

20. The apparatus according to claim 18, wherein the first physical layer control information further indicates a first group index, and the instructions further comprise instructions for:

determining, based on the first group index, a first terminal device group to which the first terminal device belongs.

* * * * *